(12) United States Patent
Teng et al.

(10) Patent No.: US 12,229,990 B2
(45) Date of Patent: Feb. 18, 2025

(54) POSITIONING METHOD AND APPARATUS

(71) Applicant: Huawei Cloud Computing Technologies Co., Ltd., Guizhou (CN)

(72) Inventors: Yidan Teng, Gui'an (CN); Kai Zhou, Shenzhen (CN); Jing Zhang, Shenzhen (CN); Qingzhi Li, Gui'an (CN); Weikang Ning, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 366 days.

(21) Appl. No.: 17/680,923

(22) Filed: Feb. 25, 2022

(65) Prior Publication Data

US 2022/0277478 A1    Sep. 1, 2022

Related U.S. Application Data

(63) Continuation of application No. PCT/CN2020/111505, filed on Aug. 26, 2020.

(30) Foreign Application Priority Data

Aug. 26, 2019  (CN) .......................... 201910791953.7

(51) Int. Cl.
*G06T 7/73*    (2017.01)
*G06T 3/10*    (2024.01)
(Continued)

(52) U.S. Cl.
CPC .................. *G06T 7/74* (2017.01); *G06T 3/10* (2024.01); *G06V 10/24* (2022.01); *G06V 10/40* (2022.01);
(Continued)

(58) Field of Classification Search
CPC ... G06T 7/74; G06T 3/10; G06T 2207/30244; G06T 2207/30264; G06V 10/24;
(Continued)

(56) References Cited

U.S. PATENT DOCUMENTS

2011/0025845 A1* 2/2011 Han .......................... G06T 7/73
348/140
2018/0295347 A1  10/2018 Ishimaru et al.
(Continued)

FOREIGN PATENT DOCUMENTS

CN    101261738 A    9/2008
CN    103559791 A    2/2014
(Continued)

OTHER PUBLICATIONS

Schwesinger Ulrich et al, "Automated valet parking and charging fore-mobility," 2016 IEEE Intelligent Vehicles Symposium (IV), IEEE, Jun. 19, 2016, pp. 157-164, XP032938958, 8 Pages.
(Continued)

*Primary Examiner* — Shefali D Goradia
(74) *Attorney, Agent, or Firm* — Conley Rose, P.C.

(57) ABSTRACT

A positioning method includes obtaining an estimated extrinsic parameter of a camera and an intrinsic parameter of the camera, where the estimated extrinsic parameter of the camera is obtained based on world coordinates of a plurality of estimation points in a shooting region of the camera, image coordinates of the plurality of estimation points, and the intrinsic parameter of the camera; obtaining image coordinates of a target in an image shot by the camera; and obtaining world coordinates of the target based on the estimated extrinsic parameter of the camera, the intrinsic parameter of the camera, and the image coordinates of the target.

20 Claims, 17 Drawing Sheets

(51) Int. Cl.
    *G06V 10/24*     (2022.01)
    *G06V 10/40*     (2022.01)
    *G06V 20/50*     (2022.01)

(52) U.S. Cl.
    CPC .... *G06V 20/50* (2022.01); *G06T 2207/30244* (2013.01); *G06T 2207/30264* (2013.01); *G06V 2201/07* (2022.01); *G06V 2201/08* (2022.01)

(58) Field of Classification Search
    CPC .... G06V 10/40; G06V 20/50; G06V 2201/07; G06V 2201/08
    See application file for complete search history.

(56) References Cited

U.S. PATENT DOCUMENTS

| | | | | |
|---|---|---|---|---|
| 2018/0350103 | A1* | 12/2018 | Skidmore | G06T 7/73 |
| 2019/0220678 | A1* | 7/2019 | Guo | G06T 7/73 |

FOREIGN PATENT DOCUMENTS

| | | |
|---|---|---|
| CN | 106500705 A | 3/2017 |
| CN | 107784672 A | 3/2018 |
| CN | 108198216 A | 6/2018 |
| CN | 109272551 A | 1/2019 |
| CN | 109276296 A | 1/2019 |
| CN | 109472829 A | 3/2019 |
| CN | 109631896 A | 4/2019 |

OTHER PUBLICATIONS

Heng Lionel et al, "CamOdoCal: Automatic intrinsic and extrinsic calibration of a rig with multiple generic cameras and odometry," 2013 IEEE/RSJ International Conference on Intelligent Robots and Systems (ROS), IEEE, Nov. 3, 2013, pp. 1793-1800, XP032538009, 8 Pages.

* cited by examiner

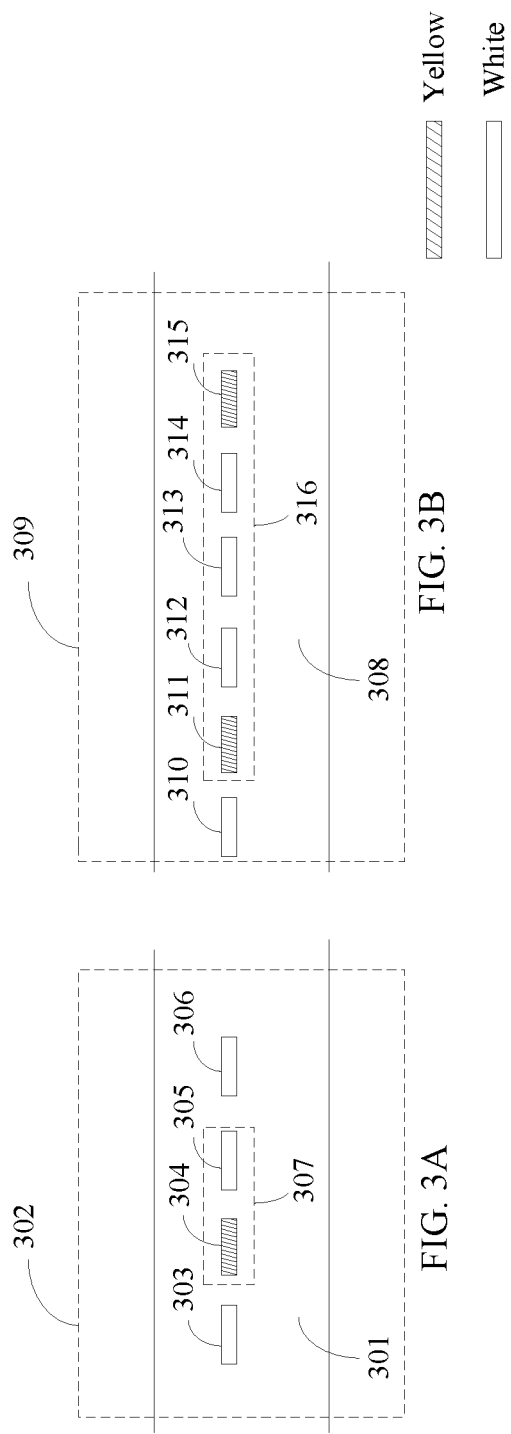

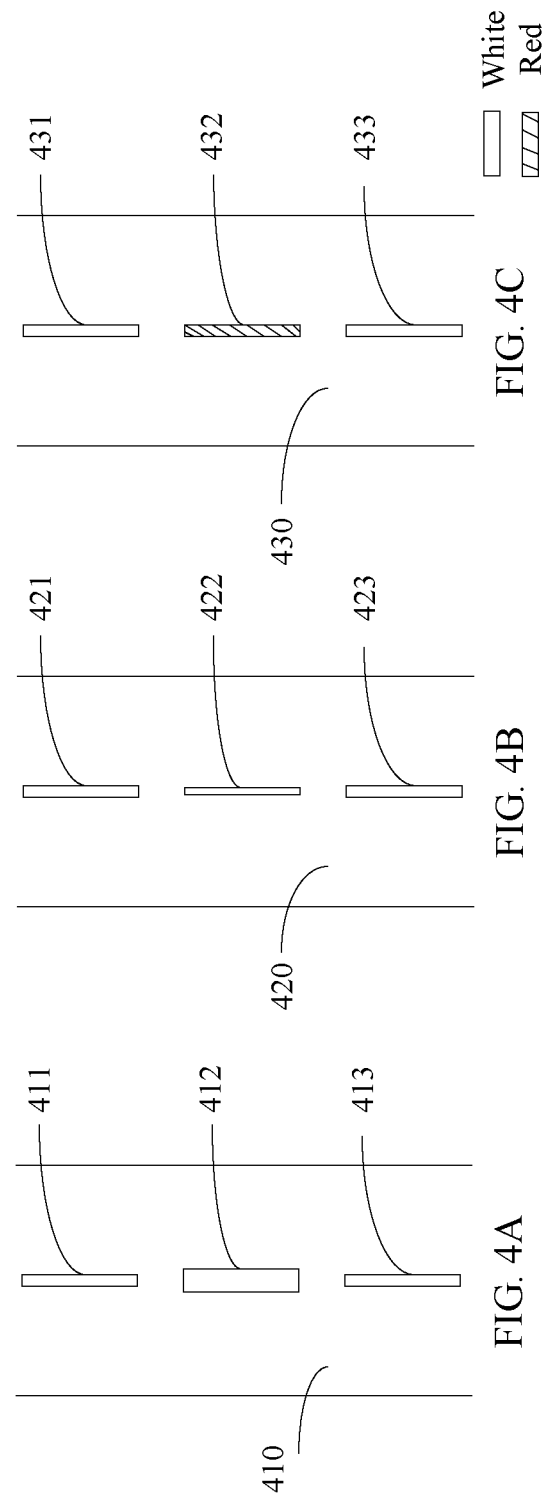

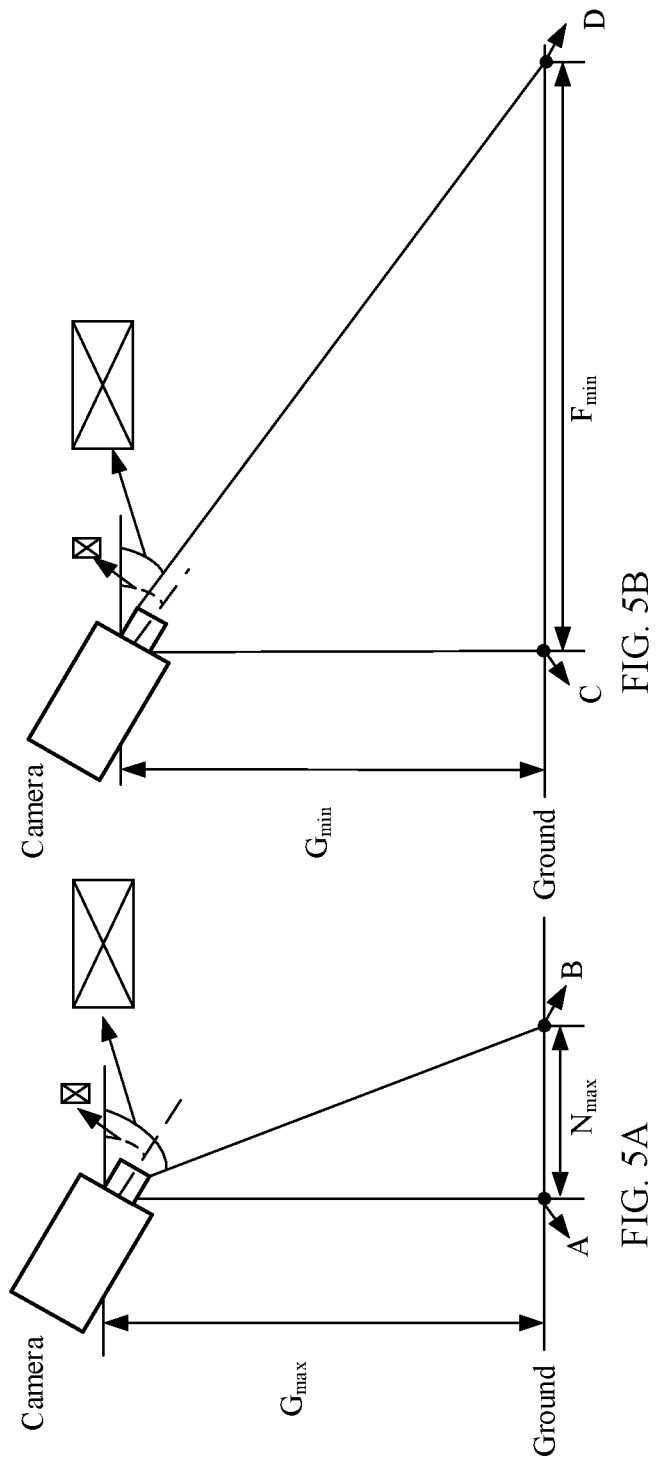

POSITIONING METHOD AND APPARATUS

CROSS-REFERENCE TO RELATED APPLICATIONS

This is a continuation of International Patent Application No. PCT/CN2020/111505 filed on Aug. 26, 2020, which claims priority to Chinese Patent Application No. 201910791953.7 filed on Aug. 26, 2019. The disclosures of the aforementioned applications are hereby incorporated by reference in their entireties.

TECHNICAL FIELD

This application relates to the field of positioning technologies, and in particular, to a positioning method and apparatus.

BACKGROUND

With the development of intelligent transportation and the popularization of vehicles with a self-driving capability, an automated valet parking (AVP) scenario is increasingly demanded. The AVP scenario simply means that a mobile terminal initiates a parking request, and establishes a connection between a vehicle positioning apparatus and a vehicle, to complete an operation such as traveling of the vehicle to a parking space from a location of the vehicle when the mobile terminal initiates the parking request.

In the AVP scenario, positioning of targets such as a vehicle and a person is a key technology. In a conventional technology, a method for positioning targets such as a vehicle and a person is to install a global navigation satellite system (GNSS) or a Global Positioning System (GPS) on a vehicle end or a terminal device carried by a person, and position the targets such as the vehicle and the person by using the GNSS or the GPS installed on the vehicle end or the terminal device carried by the person. The GNSS or the GPS does not have high positioning precision, and positioning is easily affected by an obstruction. Therefore, a positioning effect in an indoor or underground environment is definitely reduced.

SUMMARY

Embodiments of this application provide a positioning method and apparatus, so that in a positioning process, positioning is not easily affected by an obstruction, and positioning precision is relatively high.

To achieve the foregoing objective, the following technical solutions are used in the embodiments of this application.

According to a first aspect, an embodiment of this application provides a positioning method. The method includes obtaining an estimated extrinsic parameter of a camera and an intrinsic parameter of the camera, where the estimated extrinsic parameter of the camera is obtained based on world coordinates of a plurality of estimation points in a shooting region of the camera, image coordinates of the plurality of estimation points, and the intrinsic parameter of the camera, obtaining image coordinates of a target in an image shot by the camera, and obtaining world coordinates of the target based on the estimated extrinsic parameter of the camera, the intrinsic parameter of the camera, and the image coordinates of the target.

According to the technical solution provided in the first aspect, the estimated extrinsic parameter of the camera, the intrinsic parameter of the camera, and the image coordinates of the target in the image shot by the camera may be obtained, and the world coordinates of the target may be obtained based on the estimated extrinsic parameter of the camera, the intrinsic parameter of the camera, and the image coordinates of the target. In this way, the target is positioned, and positioning precision is relatively high because positioning is not easily affected by an obstruction in a positioning process.

With reference to the first aspect, in a first possible implementation, if the target is a vehicle, the method further includes obtaining image information of the target, and querying for a feature parameter of the vehicle based on the image information of the target, and obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, performing coordinate transformation on the image coordinates of the target, the physical transformation matrix corresponding to the estimated extrinsic parameter of the camera, and the intrinsic parameter matrix of the camera, to obtain first world coordinates, and obtaining the world coordinates of the target based on the feature parameter of the vehicle, a height of the camera, a location of the camera, and the first world coordinates. Based on the first possible implementation of the first aspect, if the target is a vehicle, a feature parameter of the vehicle may be obtained through query based on the image information of the target, coordinate transformation may be performed on the image coordinates of the target, the physical transformation matrix corresponding to the estimated extrinsic parameter of the camera, and the intrinsic parameter matrix of the camera, to obtain first world coordinates, and the world coordinates of the target may be obtained based on the feature parameter of the vehicle, the height of the camera, the location of the camera, and the first world coordinates. In this way, the vehicle is positioned, and in a positioning process, the image coordinates of the target are first obtained by using an image processing method, and then the world coordinates of the target are calculated by using a mathematical formula, so that positioning precision is relatively high because positioning is not easily affected by an obstruction.

With reference to the first aspect and the first possible implementation of the first aspect, in a second possible implementation, if the target is a vehicle, the image coordinates of the target are coordinates of a feature pixel of the target in the image shot by the camera. Based on the second possible implementation of the first aspect, if the target is a vehicle, the world coordinates of the target may be obtained based on the estimated extrinsic parameter of the camera, the intrinsic parameter of the camera, and the coordinates of the feature pixel of the target in the image shot by the camera. In this way, the target is positioned, and positioning precision is relatively high because positioning is not easily affected by an obstruction in a positioning process.

With reference to the first aspect, in a third possible implementation, if the target is not a vehicle, obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, and performing coordinate transformation on the image coordinates of the target, the physical transformation matrix corresponding to the estimated extrinsic parameter of the camera, and the intrinsic parameter matrix of the camera, to obtain the world coordinates of the target. Based on the third possible implementation of the first aspect, if the target is not a vehicle, coordinate transformation may be performed on the image coordinates of the target, the physical transformation matrix corresponding to the estimated extrinsic parameter of the camera, and the intrinsic parameter matrix of the camera, to obtain the world coordinates of the target. In this way, the target is positioned, and in a positioning process, the image coordinates of the target are first obtained by using an image processing method, and then the world coordinates of the target are calculated by using a mathematical formula, so that positioning precision is relatively high because positioning is not easily affected by an obstruction.

With reference to the first aspect and the third possible implementation of the first aspect, in a fourth possible implementation, if the target is not a vehicle, the image coordinates of the target are coordinates of a contact point between the target and ground in the image shot by the camera. Based on the fourth possible implementation of the first aspect, if the target is not a vehicle, the world coordinates of the target may be obtained based on the estimated extrinsic parameter of the camera, the intrinsic parameter of the camera, and the coordinates of the contact point between the target and the ground in the image shot by the camera. In this way, the target is positioned, and positioning precision is relatively high because positioning is not easily affected by an obstruction in a positioning process.

With reference to the first aspect and the possible implementations of the first aspect, in a fifth possible implementation, the method further includes obtaining world coordinates of a first deviation based on the estimated extrinsic parameter of the camera, the intrinsic parameter of the camera, and image coordinates of the first deviation, where the image coordinates of the first deviation are coordinates obtained after a deviation d is added to the image coordinates of the target towards a vehicle traveling direction, obtaining world coordinates of a second deviation based on the estimated extrinsic parameter of the camera, the intrinsic parameter of the camera, and image coordinates of the second deviation, where the image coordinates of the second deviation are coordinates obtained after the deviation d is subtracted from the image coordinates of the target towards the vehicle traveling direction, and calculating a distance between the world coordinates of the first deviation and the world coordinates of the second deviation, to obtain positioning precision of the target. Based on the fifth possible implementation of the first aspect, the world coordinates of the first deviation may be obtained based on the estimated extrinsic parameter of the camera, the intrinsic parameter of the camera, and the image coordinates of the first deviation, the world coordinates of the second deviation may be obtained based on the estimated extrinsic parameter of the camera, the intrinsic parameter of the camera, and the image coordinates of the second deviation, and then the distance between the world coordinates of the first deviation and the world coordinates of the second deviation is calculated to obtain the positioning precision of the target. In this way, a vehicle or a person can be more accurately positioned.

With reference to the first aspect and the possible implementations of the first aspect, in a sixth possible implementation, the method further includes obtaining world coordinates of a special visual identifier in the shooting region of the camera, where the special visual identifier is located between first coordinates and second coordinates of the shooting region of the camera, and the first coordinates are coordinates of a location with a maximum value of a near-point distance of a field of view of the camera, and the second coordinates are coordinates of a location with a minimum value of a far-point distance of the field of view of the camera, obtaining the world coordinates of the plurality of estimation points in the shooting region based on the world coordinates of the special visual identifier, obtaining image coordinates of the special visual identifier in the shooting region of the camera, obtaining the image coordinates of the plurality of estimation points in the shooting region based on the image coordinates of the special visual identifier, and obtaining the estimated extrinsic parameter of the camera based on the world coordinates of the plurality of estimation points, the image coordinates of the plurality of estimation points, and the intrinsic parameter of the camera. Based on the sixth possible implementation of the first aspect, the world coordinates of the special visual identifier in the shooting region of the camera may be obtained, the world coordinates of the plurality of estimation points in the shooting region may be obtained based on the world coordinates of the special visual identifier, the image coordinates of the special visual identifier in the shooting region of the camera may be obtained, the image coordinates of the plurality of estimation points in the shooting region may be obtained based on the image coordinates of the special visual identifier, and then the estimated extrinsic parameter of the camera may be obtained based on the world coordinates of the plurality of estimation points, the image coordinates of the plurality of estimation points, and the intrinsic parameter of the camera, to subsequently position the target based on the estimated extrinsic parameter of the camera, the intrinsic parameter of the camera, and the image coordinates of the target.

With reference to the sixth possible implementation of the first aspect, in a seventh possible implementation, obtaining the estimated extrinsic parameter of the camera based on the world coordinates of the plurality of estimation points, the image coordinates of the plurality of estimation points, and the intrinsic parameter of the camera includes obtaining the intrinsic parameter matrix of the camera based on the intrinsic parameter of the camera, obtaining, based on the world coordinates of the plurality of estimation points, the image coordinates of the plurality of estimation points, and the intrinsic parameter matrix of the camera, an equation system in which the physical transformation matrix corresponding to the estimated extrinsic parameter of the camera is an unknown number, and obtaining, by solving the equation system, the physical transformation matrix corresponding to the estimated extrinsic parameter of the camera, and obtaining the estimated extrinsic parameter of the camera based on the physical transformation matrix corresponding to the estimated extrinsic parameter of the camera. Based on the seventh possible implementation of the first aspect, the intrinsic parameter matrix of the camera may be obtained based on the intrinsic parameter of the camera, the equation system in which the physical transformation matrix corresponding to the estimated extrinsic parameter of the camera is an unknown number may be obtained based on the world coordinates of the plurality of estimation points, the image coordinates of the plurality of estimation points, and the intrinsic parameter matrix of the camera, the physical transformation matrix corresponding to the estimated extrinsic parameter of the camera may be obtained by solving the equation system, and the estimated extrinsic parameter of the camera may be finally obtained based on the physical transformation matrix corresponding to the estimated extrinsic parameter of the camera, to subsequently position the target based on the estimated extrinsic parameter of the camera, the intrinsic parameter of the camera, and the image coordinates of the target.

With reference to the sixth possible implementation and the seventh possible implementation of the first aspect, in an eighth possible implementation, the special visual identifier is a division line, and the division line is different from a division line surrounding the division line. Based on the eighth possible implementation of the first aspect, a division line different from a surrounding division line may be used as a special visual identifier, to determine the world coordinates of the plurality of estimation points and the image coordinates of the plurality of estimation points based on the special visual identifier, and then obtain the estimated extrinsic parameter of the camera based on the world coordinates of the plurality of estimation points, the image coordinates of the plurality of estimation points, and the intrinsic parameter of the camera, to position the target based on the estimated extrinsic parameter of the camera, the intrinsic parameter of the camera, and the image coordinates of the target.

With reference to the first aspect and the possible implementations of the first aspect, in a ninth possible implementation, the method further includes updating the estimated extrinsic parameter of the camera to an electronic map. Based on the ninth possible implementation of the first aspect, the estimated extrinsic parameter of the camera may be updated to the electronic map, to subsequently position the target based on the estimated extrinsic parameter of the camera, the intrinsic parameter of the camera, and the image coordinates of the target.

With reference to the first aspect and the possible implementations of the first aspect, in a tenth possible implementation, the method further includes updating the world coordinates of the target to the electronic map, or sending the world coordinates of the target to a traveling vehicle. Based on the tenth possible implementation of the first aspect, the world coordinates of the target may be updated to the electronic map, or the world coordinates of the target may be sent to a traveling vehicle, so that the vehicle performs positioning based on the world coordinates of the target.

According to a second aspect, an embodiment of this application provides a positioning method. The method includes obtaining an initial extrinsic parameter of a camera and an intrinsic parameter of the camera, and determining a location of a special visual identifier in a parking lot based on the initial extrinsic parameter of the camera and the intrinsic parameter of the camera, where the special visual identifier is used to position a target in a shooting region of the camera.

Based on the technical solution provided in the second aspect, the initial extrinsic parameter of the camera and the intrinsic parameter of the camera may be obtained, and the location of the special visual identifier in the parking lot may be determined based on the initial extrinsic parameter of the camera and the intrinsic parameter of the camera, to subsequently determine world coordinates of a plurality of estimation points and image coordinates of the plurality of estimation points based on the special visual identifier, and then obtain an estimated extrinsic parameter of the camera based on the world coordinates of the plurality of estimation points, the image coordinates of the plurality of estimation points, and the intrinsic parameter of the camera, to position the target based on the estimated extrinsic parameter of the camera, the intrinsic parameter of the camera, and the image coordinates of the target.

With reference to the second aspect, in a first possible implementation of the second aspect, determining a location of a special visual identifier in a parking lot based on the initial extrinsic parameter of the camera and the intrinsic parameter of the camera includes determining, based on the initial extrinsic parameter of the camera and the intrinsic parameter of the camera, a location with a maximum value of a near-point distance of a field of view of the camera and a location with a minimum value of a far-point distance of the field of view of the camera, and determining a region between the location with the maximum value of the near-point distance of the field of view of the camera and the location with the minimum value of the far-point distance of the field of view of the camera as the location of the special visual identifier. Based on the first possible implementation of the second aspect, the location with the maximum value of the near-point distance of the field of view of the camera and the location with the minimum value of the far-point distance of the field of view of the camera may be first determined based on the initial extrinsic parameter of the camera and the intrinsic parameter of the camera, and then the region between the location with the maximum value of the near-point distance of the field of view of the camera and the location with the minimum value of the far-point distance of the field of view of the camera may be determined as the location of the special visual identifier, to subsequently determine world coordinates of a plurality of estimation points and image coordinates of the plurality of estimation points based on the special visual identifier, and then obtain an estimated extrinsic parameter of the camera based on the world coordinates of the plurality of estimation points, the image coordinates of the plurality of estimation points, and the intrinsic parameter of the camera, to position the target based on the estimated extrinsic parameter of the camera, the intrinsic parameter of the camera, and the image coordinates of the target.

With reference to the second aspect and the first possible implementation of the second aspect, in a second possible implementation, the initial extrinsic parameter of the camera includes a location of the camera, a height of the camera, and a pitch angle of the camera. Based on the second possible implementation of the second aspect, the location of the camera, the height of the camera, the pitch angle of the camera, and the intrinsic parameter of the camera may be obtained, and the location of the special visual identifier in the parking lot may be determined based on the location of the camera, the height of the camera, the pitch angle of the camera, and the intrinsic parameter of the camera, to subsequently determine world coordinates of a plurality of estimation points and image coordinates of the plurality of estimation points based on the special visual identifier, and then obtain an estimated extrinsic parameter of the camera based on the world coordinates of the plurality of estimation points, the image coordinates of the plurality of estimation points, and the intrinsic parameter of the camera, to position the target based on the estimated extrinsic parameter of the camera, the intrinsic parameter of the camera, and the image coordinates of the target.

According to a third aspect, an embodiment of this application provides a positioning apparatus. The positioning apparatus has a function of implementing the method described in the first aspect. The function may be implemented by hardware, or may be implemented by hardware executing corresponding software. The hardware or the software includes one or more modules corresponding to the function.

According to a fourth aspect, an embodiment of this application provides a positioning apparatus. The positioning apparatus has a function of implementing the method described in the second aspect. The function may be implemented by hardware, or may be implemented by hardware executing corresponding software. The hardware or the software includes one or more modules corresponding to the function.

According to a fifth aspect, an embodiment of this application provides a positioning apparatus, including at least one processor and at least one memory. The at least one memory is coupled to the at least one processor. The at least one memory is configured to store a computer program, so that when the computer program is executed by the at least one processor, the positioning method according to the first aspect and the possible implementations of the first aspect is implemented. Optionally, the positioning apparatus further includes a communications interface. The communications interface is coupled to the at least one processor. The positioning apparatus communicates with another device by using the communications interface.

According to a sixth aspect, an embodiment of this application provides a positioning apparatus, including at least one processor and at least one memory. The at least one memory is coupled to the at least one processor. The at least one memory is configured to store a computer program, so that when the computer program is executed by the at least one processor, the positioning method according to the second aspect and the possible implementations of the second aspect is implemented. Optionally, the positioning apparatus further includes a communications interface. The communications interface is coupled to the at least one processor. The positioning apparatus communicates with another device by using the communications interface.

According to a seventh aspect, this application provides a system chip. The system chip may be applied to a positioning apparatus. The system chip includes at least one processor, and related program instructions are executed by the at least one processor, to implement the positioning method according to the first aspect and the possible implementations of the first aspect. Optionally, the system chip may further include at least one memory. The memory stores the related program instructions.

According to an eighth aspect, this application provides a system chip. The system chip may be applied to a positioning apparatus. The system chip includes at least one processor, and related program instructions are executed by the at least one processor, to implement the positioning method according to the second aspect and the possible implementations of the second aspect. Optionally, the system chip may further include at least one memory. The memory stores the related program instructions.

According to a ninth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the first aspect. For example, the computer may be at least one storage node.

According to a tenth aspect, an embodiment of this application provides a computer-readable storage medium, for example, a non-transient computer-readable storage medium. The computer-readable storage medium stores a computer program. When the computer program is run on a computer, the computer is enabled to perform any possible method according to the second aspect. For example, the computer may be at least one storage node.

According to an eleventh aspect, an embodiment of this application provides a computer program product. When the computer program product runs on a computer, any method provided in the first aspect is performed. For example, the computer may be at least one storage node.

According to a twelfth aspect, an embodiment of this application provides a computer program product. When the computer program product runs on a computer, any method provided in the second aspect is performed. For example, the computer may be at least one storage node.

It may be understood that any positioning apparatus, system chip, computer storage medium, or computer program product provided above is configured to perform a corresponding method provided above. Therefore, for beneficial effects that can be achieved by the positioning apparatus, the system chip, the computer storage medium, or the computer program product, refer to beneficial effects in the corresponding method. Details are not described herein again.

BRIEF DESCRIPTION OF DRAWINGS

FIG. 3A and FIG. 3B are schematic diagrams of visual identifiers according to an embodiment of this application;

FIG. 4A, FIG. 4B, and FIG. 4C are schematic diagrams of deployment of a special visual identifier according to an embodiment of this application;

FIG. 5A and FIG. 5B are schematic diagrams of a shooting region of a camera according to an embodiment of this application;

DESCRIPTION OF EMBODIMENTS

A basic principle of embodiments of this application is obtaining image coordinate system information of a target (for example, a vehicle or a person) in an AVP scenario by using image information captured by a visual perception device (for example, a camera) deployed on a site end/roadside and a visual identifier such as a division line, transforming the obtained image coordinate system information into world coordinate system information based on a transformation relationship between the image coordinate system information and the world coordinate system information, completing positioning of the target based on the world coordinate system information of the target, and transmitting the positioning of the target to a vehicle in real time through a network. In this way, the target may be positioned by using the visual perception device deployed in the AVP scenario. The visual perception device is not easily affected by an obstruction when capturing image information. Therefore, compared with an existing positioning method, positioning precision, especially positioning precision in an indoor or underground environment, can be improved by positioning the target by using the visual perception device.

An image coordinate system is a coordinate system that is established on an image shot by the camera and that uses a center of an image shot by the camera as an origin. The image coordinate system is a two-dimensional coordinate system. The image coordinate system information includes image coordinates of a point in the image coordinate system.

A world coordinate system is a coordinate system used by an electronic map. The world coordinate system is a three-dimensional coordinate system. The world coordinate system information includes world coordinates of a point in the world coordinate system.

In the embodiments of this application, an example in which the visual perception device is a camera is used for description.

Figure 1:
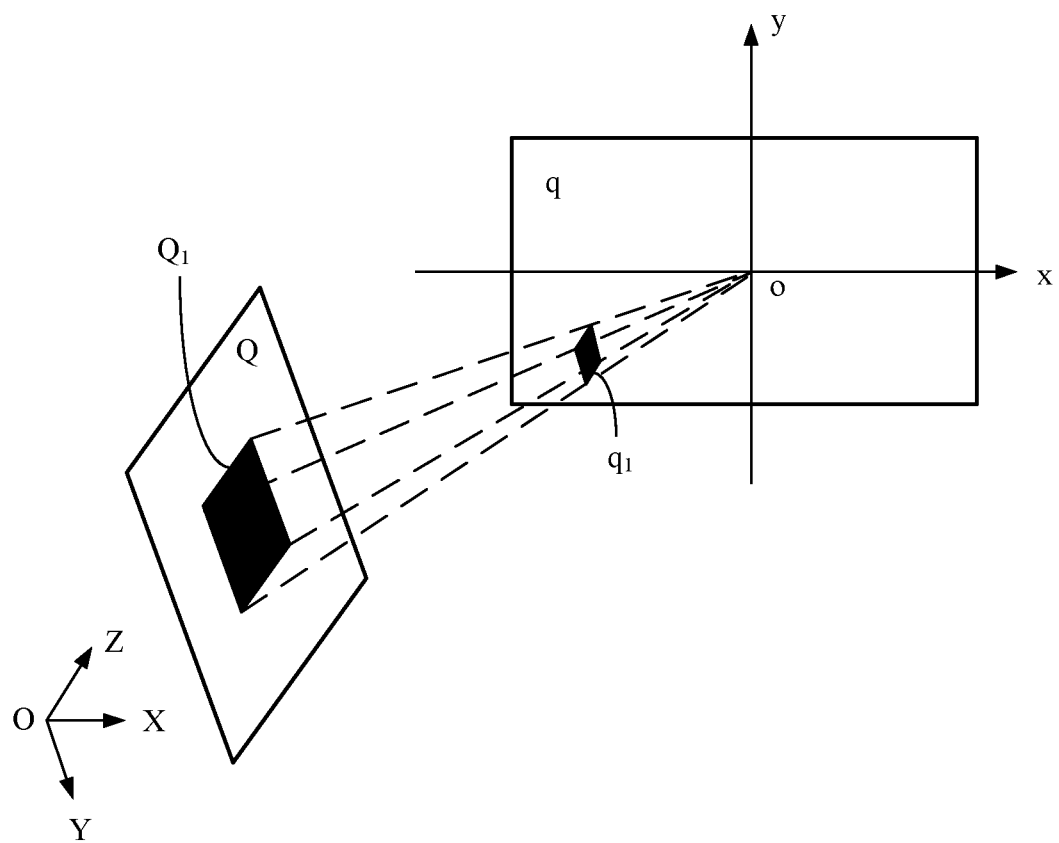
FIG. 1 is a principle diagram of a positioning method according to an embodiment of this application.

The transformation relationship between the image coordinate system information and the world coordinate system information may be shown in FIG. 1.

In FIG. 1, a two-dimensional coordinate system o-xy is an image coordinate system of an image q shot by a camera, an intersection point of an x-axis and a y-axis is o, that is, o is an origin of the image coordinate system, and coordinates of any point on an image plane q may be represented by image coordinates (x, y). A three-dimensional coordinate system O-XYZ is a coordinate system used by an electronic map, that is, a world coordinate system, and any plane in the world coordinate system may be referred to as a world plane. A world plane Q is any plane in the electronic map (that is, the world plane Q is any plane in O-XYZ), and coordinates of any point on the world plane Q may be represented by world coordinates (X, Y, Z). The image plane q and the world plane Q are in the following transformation relationship: q=sHQ.

q represents image coordinates of a point on the image plane, Q represents world coordinates of a point on the world plane, s is a scale factor, and the homography matrix H=MW.

$$M = \begin{bmatrix} f_x & 0 & c_x \\ 0 & f_y & c_y \\ 0 & 0 & 1 \end{bmatrix},$$

M is an intrinsic parameter matrix of the camera, and $f_x$ represents a product of a physical focal length of a lens in the camera and each cell size of imaging in an x direction. $f_y$ represents a product of the physical focal length of the lens in the camera and each cell size of imaging in a y direction. $c_x$ represents an offset of a projection coordinate center relative to an optical axis in the x direction, and $c_y$ represents an offset of the projection coordinate center relative to the optical axis in the y direction. Each cell size of imaging may be one pixel in the image shot by the camera.

W=[R, t], and W is a physical transformation matrix of an extrinsic parameter of the camera. R is a 3×3 orthogonal identity matrix, also referred to as a rotation matrix, and t is a three-dimensional translation vector.

The transformation relationship is mainly applied to the following two cases.

Case 1: If the image plane q and the world plane Q are in the transformation relationship, and image coordinates of a point on q, the scale factor, and the homography matrix H are known, world coordinates of the point on Q may be calculated based on the transformation relationship between the image plane and the world plane.

For example, in FIG. 1, image coordinates of a point on the plane q are $(x_1, y_1)$. If the intrinsic parameter matrix of the camera is M, the physical transformation matrix of the extrinsic parameter of the camera is W, and the scale factor is s, an equation $$\begin{pmatrix} x_1 \\ y_1 \\ 1 \end{pmatrix} = sH \begin{pmatrix} X_1 \\ Y_1 \\ Z_1 \\ 1 \end{pmatrix}$$

with $X_1, Y_1, Z_1$ as unknown numbers may be obtained based on the transformation relationship between the image plane and the world plane. H=MW, and the coordinates $(X_1, Y_1, Z_1)$ of the point on the world plane Q may be obtained by solving the equation.

Case 2: If the image plane q and the world plane Q are in the transformation relationship, and image coordinates of a plurality of points on q, world coordinates of the plurality of points on the world plane Q, and the intrinsic parameter matrix of the camera are known, a product of the scale factor and the physical transformation matrix of the extrinsic parameter of the camera may be calculated based on the transformation relationship between the image plane and the world plane.

For example, in FIG. 1, $Q_1$ is a rectangle on the world plane Q, and a rectangle $q_1$ is a rectangle obtained by mapping the rectangle $Q_1$ onto the image plane q based on the transformation relationship between the image plane and the world plane. If image coordinates of four corners of the rectangle $q_1$ are $(x_1, y_1)$, $(x_2, y_2)$, $(x_3, y_3)$, and $(x_4, y_4)$, respectively, and world coordinates of four corners of the rectangle $Q_1$ are $(X_1, Y_1, Z_1)$, $(X_2, Y_2, Z_2)$, $(X_3, Y_3, Z_3)$, and $(X_4, Y_4, Z_4)$, respectively, and the intrinsic parameter matrix of the camera is M, an overdetermined equation $$\begin{pmatrix} x_1 & x_2 & x_3 & x_4 \\ y_1 & y_2 & y_3 & y_4 \\ 1 & 1 & 1 & 1 \end{pmatrix} = sH \begin{pmatrix} X_1 & X_2 & X_3 & X_4 \\ Y_1 & Y_2 & Y_3 & Y_4 \\ Z_1 & Z_2 & Z_3 & Z_4 \\ 1 & 1 & 1 & 1 \end{pmatrix}$$

with sH as an unknown number may be obtained based on the transformation relationship between the image plane and the world plane. sH may be obtained by solving the overdetermined equation by using a method such as a constrained least square method or random sample consensus, and then the product of the scale factor and the physical transformation matrix of the extrinsic parameter of the camera is obtained by dividing sH by the intrinsic parameter matrix M of the camera.

The following describes in detail implementations of the embodiments of this application based on the foregoing principle with reference to accompanying drawings.

Figure 2:
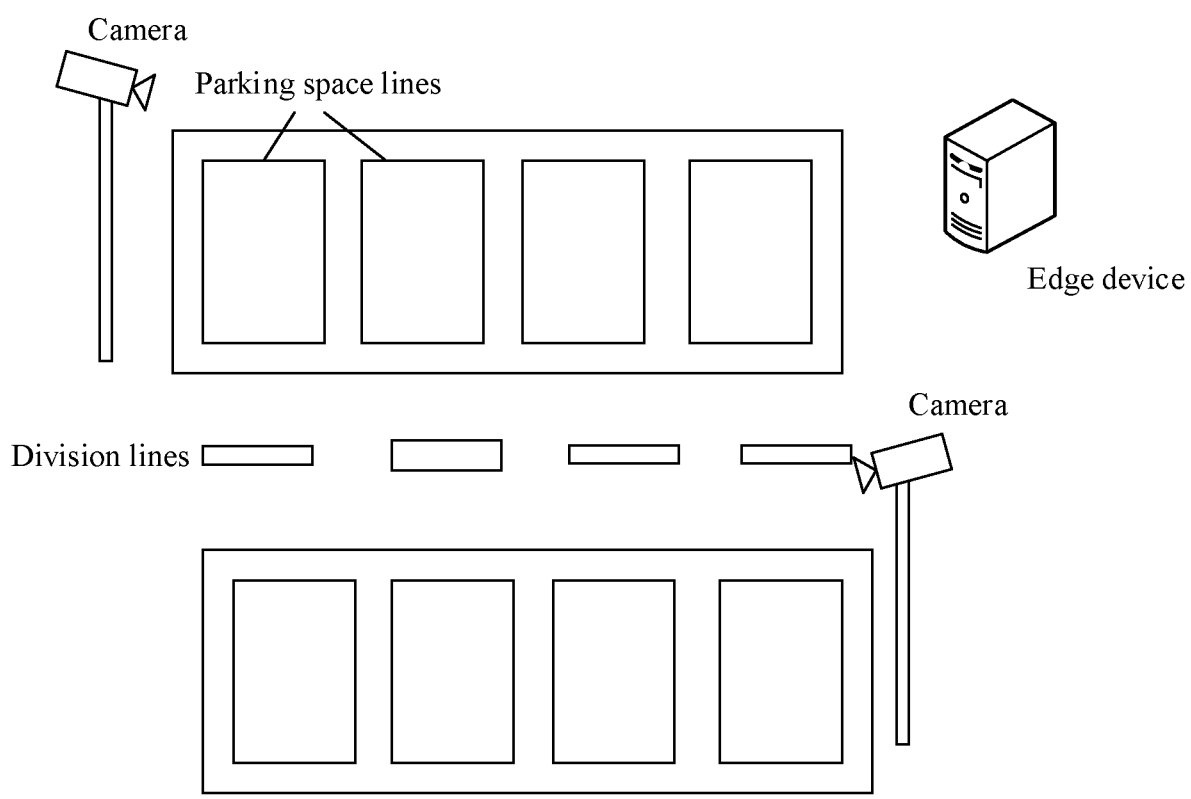
FIG. 2 is a schematic diagram of a parking lot according to an embodiment of this application.

A method provided in the embodiments of this application may be applied to any parking lot, to position a vehicle or a person in the parking lot. FIG. 2 is a schematic diagram of a parking lot according to an embodiment of this application. Before the positioning method provided in the embodiments of this application is performed, initial deployment shown in FIG. 2 may be performed on the parking lot based on a requirement. After the deployment is completed, as shown in FIG. 2, the parking lot may include a camera, an edge device, and a plurality of visual identifiers such as a division line and a parking space line. Shooting regions of a plurality of cameras can cover the entire parking lot.

The camera may include a conventional camera and an intelligent camera. The conventional camera is a camera only with a shooting capability. The intelligent camera is a camera with image processing and artificial intelligence algorithm functions in addition to the shooting capability. The camera may store an intrinsic parameter of the camera, for example, a field of view (FOV) and a focal length of the camera.

The intelligent camera may extract, by using an image processing method, image coordinates of a plurality of estimation points in an image shot by the intelligent camera, and the intelligent camera may further detect, by using an artificial intelligence algorithm, whether a target (for example, a vehicle, a person, or an animal) exists in the image shot by the intelligent camera.

Optionally, if the camera is a conventional camera, an edge computing apparatus (not shown in FIG. 2) is deployed in the parking lot.

The edge computing apparatus has the image processing and artificial intelligence algorithm functions. The edge computing apparatus may communicate with one or more conventional cameras. For example, the edge computing apparatus may obtain an image from the conventional camera and extract, by using an image processing method, image coordinates of a plurality of estimation points in the image from the conventional camera. For another example, the edge computing apparatus may obtain an image from the conventional camera, and detect, by using an artificial intelligence algorithm, whether an object (for example, a vehicle, a person, or an animal) exists in the image from the conventional camera.

The camera may communicate with the edge device in a wired or wireless manner.

The edge device may be a server of the parking lot, or may be a processor having a computing processing capability of a graphics processing unit (GPU), for example, an intelligent transportation edge server or an intelligent transportation edge computing box. Optionally, the edge device stores an electronic map of the parking lot. The electronic map of the parking lot is generated by using a method such as scanning using an in-vehicle lidar, and the electronic map of the parking lot is uploaded to the edge device.

The electronic map may include a map layer. The map layer may be configured to store a parameter required for performing the positioning method provided in the embodiments of this application.

In a possible implementation, the map layer stores world coordinates of a visual identifier in a shooting region of each camera. For example, the map layer stores world coordinates of a general visual identifier 303 (such as world coordinates of four corners of the general visual identifier 303), world coordinates of a special visual identifier 304 (such as world coordinates of four corners of the special visual identifier 304), world coordinates of a general visual identifier 305 (such as world coordinates of four corners of the general visual identifier 305), and world coordinates of a general visual identifier 306 (such as world coordinates of four corners of the general visual identifier 306) in a shooting region 302 of a camera 1 in FIG. 3A. The map layer also stores world coordinates of a general visual identifier 310 (such as world coordinates of four corners of the general visual identifier 310), world coordinates of a special visual identifier 311 (such as world coordinates of four corners of the special visual identifier 311), world coordinates of a general visual identifier 312 to a general visual identifier 314 (such as world coordinates of four corners of the general visual identifier 312 to the general visual identifier 314), and world coordinates of a special visual identifier 315 (such as world coordinates of four corners of the special visual identifier 315) in a shooting region 309 of a camera 2 in FIG. 3B.

In another possible implementation, the map layer stores world coordinates of a visual identifier in a shooting region of each camera and an initial extrinsic parameter of each camera.

For example, the map layer stores world coordinates of a visual identifier in a shooting region 302 of a camera 1 in FIG. 3A, an initial extrinsic parameter (such as a location of the camera 1, a height G of an optical center of the camera 1, and a pitch angle θ of the camera 1) of the camera 1 that is recorded when the camera 1 is installed, world coordinates of a visual identifier in a shooting region 309 of a camera 2, and an initial extrinsic parameter (such as a location of the camera 2, a height G of an optical center of the camera 2, and a pitch angle θ of the camera 2) of the camera 2 that is recorded when the camera 2 is installed.

The visual identifier may be an identifier such as a division line, a parking space line, a column, or the like.

Optionally, the visual identifier includes a special visual identifier and a general visual identifier. The special visual identifier and the general visual identifier are relative concepts. The special visual identifier may be a visual identifier that is relatively sparsely distributed in the parking lot and that is easy to be detected, recognized, or positioned. The special visual identifier may be used to assist with positioning. A visual identifier other than the special visual identifier may be referred to as a general visual identifier. The special visual identifier may have at least one of the following features: (1) the special visual identifier is an identifier different from the general visual identifier, (2) the special visual identifier is compatible with a vehicle-end sensing system, without ambiguity and interference to functions such as road detection of a vehicle-end automated driving system, or (3) the special visual identifier needs to comply with requirements of a standard (such as P2020) in the field of automated driving on color separability and other characteristics of signs, and an entity should not be added as far as possible, so as not to affect integrity of an original road identifier.

It should be noted that the parking lot shown in FIG. 2 is merely an example and is not intended to limit the technical solutions of this application. A person skilled in the art should understand that, in a specific implementation process, the parking lot shown in FIG. 2 may further include another device, and quantities of edge devices, cameras, and visual identifiers may be determined based on a specific requirement.

For example, the visual identifier is a division line. Then, the special visual identifier may be a division line wider than the general visual identifier, or a division line in a relatively striking color.

For example, FIG. 4A to FIG. 4C are schematic diagrams of visual identifiers. In FIG. 4A, there are three visual identifiers on a road 410, which are a general visual identifier 411, a special visual identifier 412, and a general visual identifier 413, respectively. Colors of the general visual identifier 411, the special visual identifier 412, and the general visual identifier 413 are all white. The special visual identifier 412 is wider than the general visual identifier 411 and the general visual identifier 413.

For another example, in FIG. 4B, there are three visual identifiers on a road 420, which are a general visual identifier 421, a special visual identifier 422, and a general visual identifier 423, respectively. Colors of the general visual identifier 421, the special visual identifier 422, and the general visual identifier 423 are all white. The special visual identifier 422 is narrower than the general visual identifier 421 and the general visual identifier 423.

For still another example, in FIG. 4C, there are three visual identifiers on a road 430, which are a general visual identifier 431, a special visual identifier 432, and a general visual identifier 433, respectively. Colors of the general visual identifier 431 and the general visual identifier 433 are white, and a color of the special visual identifier 432 is red.

It should be noted that the special visual identifier 412, the special visual identifier 422, and the special visual identifier 432 shown in FIG. 4A to FIG. 4C are merely examples of the special visual identifier. In an actual application, the special visual identifier may alternatively be an identifier in another form. This is not limited.

The camera and the visual identifier may be deployed in the following manner 1 or manner 2.

Manner 1 may include step 1 and step 2.

Step 1: Obtain an initial extrinsic parameter of the camera and an intrinsic parameter of the camera.

The initial extrinsic parameter of the camera may be described as an extrinsic parameter of the camera that is obtained by manual measurement after the camera is installed. The extrinsic parameter of the camera may include, but is not limited to, a location of the camera, a height G of the camera, a pitch angle θ of the camera, and the like.

The location of the camera is a location at which the camera is installed in the parking lot (for example, world coordinates after the camera is installed). The height of the camera may be a height of an optical center of the camera, and the height of the optical center of the camera is a height of the optical center of the camera from ground. The pitch angle of the camera is an angle between a center beam of the camera and the ground.

First, related personnel may plan the location of the camera based on an area of the parking lot and a size of coverage of the camera, install the camera in the parking lot based on the planned location of the camera, and record the initial extrinsic parameter of the camera after the camera is installed. When the visual identifier is deployed in the parking lot, the initial extrinsic parameter may be obtained, and the intrinsic parameter of the camera may be obtained from the camera.

Step 2: Determine a location of a special visual identifier in the parking lot based on the initial extrinsic parameter of the camera and the intrinsic parameter of the camera.

According to a standard for deploying a visual identifier in a conventional technology, general visual identifiers are deployed in the parking lot, and a special visual identifier is deployed at a location of a general visual identifier in the parking lot.

Optionally, determining a location of a special visual identifier in the parking lot based on the initial extrinsic parameter of the camera and the intrinsic parameter of the camera includes determining, based on the initial extrinsic parameter of the camera and the intrinsic parameter of the camera, a location with a maximum value of a near-point distance of a field of view of the camera and a location with a minimum value of a far-point distance of the field of view of the camera, and determining a region between the location with the maximum value of the near-point distance of the field of view of the camera and the location with the minimum value of the far-point distance of the field of view of the camera as the location of the special visual identifier.

Determining, based on the initial extrinsic parameter of the camera and the intrinsic parameter of the camera, a location with a maximum value of a near-point distance of a field of view of the camera and a location with a minimum value of a far-point distance of the field of view of the camera includes calculating the maximum value of the near-point distance of the field of view of the camera based on formula 1:

$$N_{max} = \frac{G_{max}}{\tan\left(\frac{FOV}{2} + \theta - \Delta\right)},$$

calculating the minimum value of the far-point distance of the field of view of the camera based on formula 2:

$$F_{min} = \frac{G_{min}}{\tan\left(\theta - \frac{FOV}{2} + \Delta\right)},$$

and calculating the location with the maximum value of the near-point distance of the field of view of the camera based on the location of the camera and the maximum value of the near-point distance of the field of view of the camera, and calculating the location with the minimum value of the far-point distance of the field of view of the camera based on the location of the camera and the minimum value of the far-point distance of the field of view of the camera.

$N_{max}$ is the maximum value of the near-point distance of the field of view of the camera, $G_{min}$ is a minimum value of the height of the optical center of the camera, FOV is the field of view of the camera, θ is the pitch angle of the camera, Δ is an estimated range of the pitch angle of the camera, $G_{max}$ is a maximum value of the height of the optical center of the camera, and $F_{min}$ is the minimum value of the far-point distance of the field of view of the camera.

The maximum value of the near-point distance of the field of view of the camera means a distance between a location (a point A in FIG. 5A) to which the camera is projected on the ground and a location (a point B in FIG. 5A) at which a lower beam of the camera intersects the ground in a case of the maximum height of the optical center of the camera and the minimum pitch angle of the camera. The location with the maximum value of the near-point distance of the field of view of the camera is the location at which the lower beam of the camera intersects the ground in the case of the maximum height of the optical center of the camera and the minimum pitch angle of the camera.

The minimum value of the far-point distance of the field of view of the camera means a distance between a location (a point C in FIG. 5B) to which the camera is projected on the ground and a location (a point D in FIG. 5B) at which an upper beam of the camera intersects the ground in a case of the minimum height of the optical center of the camera and the maximum pitch angle of the camera. The location with the minimum value of the far-point distance of the field of view of the camera is the location at which the upper beam of the camera intersects the ground in the case of the minimum height of the optical center of the camera and the maximum pitch angle of the camera.

In FIG. 3A, there is a general visual identifier 303, a special visual identifier 304, a general visual identifier 305, and a general visual identifier 306 on a road 301. A color of the general visual identifier is white, and a color of the special visual identifier is yellow. The general visual identifier 303, the special visual identifier 304, the general visual identifier 305, and the general visual identifier 306 are in a shooting region 302 of a camera 1. The special visual identifier 304 and the general visual identifier 305 are in a region 307. The region 307 is a region between a location with a maximum value of a near-point distance of a field of view of the camera 1 and a location with a minimum value of a far-point distance of the field of view of the camera 1.

In FIG. 3B, there is a general visual identifier 310, a special visual identifier 311, a general visual identifier 312, a general visual identifier 313, a general visual identifier 314, and a special visual identifier 315 on a road 308. A color of the general visual identifier is white, and a color of the special visual identifier is yellow. The general visual identifier 310, the special visual identifier 311, the general visual identifier 312, the general visual identifier 313, the general visual identifier 314, and the special visual identifier 315 are in a shooting region 309 of a camera 2. The special visual identifier 311, the general visual identifier 312, the general visual identifier 313, the general visual identifier 314, and the special visual identifier 315 are in a region 316. The region 316 is a region between a location with a maximum value of a near-point distance of a field of view of the camera 2 and a location with a minimum value of a far-point distance of the field of view of the camera 2.

It should be noted that, in the shooting region of the camera, the special visual identifier is deployed in the region between the location with the maximum value of the near-point distance of the field of view of the camera and the location with the minimum value of the far-point distance of the field of view of the camera, so that when an estimated extrinsic parameter of the camera is calculated subsequently, it is convenient to find image coordinates of a plurality of estimation points in an image shot by the camera and world coordinates of the plurality of estimation points in the electronic map. Therefore, in the shooting region of the camera, only a small quantity of special visual identifiers (for example, one to three special visual identifiers) need to be deployed in the region between the location with the maximum value of the near-point distance of the field of view of the camera and the location with the minimum value of the far-point distance of the field of view of the camera to achieve the foregoing objective.

The estimated extrinsic parameter of the camera is obtained based on the world coordinates of the plurality of estimation points in the shooting region of the camera, the image coordinates of the plurality of estimation points, and the intrinsic parameter of the camera.

Manner 2 may include step A and step B.

Step A: Deploy the visual identifier in the parking lot.

Optionally, if the visual identifier is to be deployed in an existing parking lot (a parking lot in which general visual identifiers have been deployed according to the standard for deploying a visual identifier in the conventional technology), a few general visual identifiers may be transformed into special visual identifiers based on a rule (for example, every specific distance).

Optionally, if the visual identifier is to be deployed in a newly-built parking lot (a parking lot in which no visual identifier is deployed), general visual identifiers may be deployed in the parking lot according to the standard for deploying a visual identifier in the conventional technology, and special visual identifiers are deployed based on a rule (for example, every specific distance) at locations at which general visual identifiers need to be deployed.

Step B: Deploy the cameras based on a location of a special visual identifier.

In a possible implementation, a location at which a lower beam of the camera intersects the ground in a case of a maximum height of an optical center of the camera and a location at which an upper beam of the camera intersects the ground in a case of a minimum height of the optical center of the camera and a maximum pitch angle of the camera are estimated based on the location of the special visual identifier. $G_{max}$ and $\theta$ are estimated based on the location at which the lower beam of the camera intersects the ground in the case of the maximum height of the optical center of the camera and the minimum pitch angle of the camera, a FOV of the camera, and the foregoing formula 1. $G_{min}$ and $\theta$ are estimated based on the location at which the upper beam of the camera intersects the ground in the case of the minimum height of the optical center of the camera and the maximum pitch angle of the camera, the FOV of the camera, and the foregoing formula 2. The camera is deployed based on the location at which the lower beam of the camera intersects the ground in the case of the maximum height of the optical center of the camera and the minimum pitch angle of the camera, the location at which the upper beam of the camera intersects the ground in the case of the minimum height of the optical center of the camera and the maximum pitch angle of the camera, $G_{min}$, $G_{max}$, and $\theta$, so that the special visual identifier is located between the location at which the lower beam of the camera intersects the ground in the case of the maximum height of the optical center of the camera and the minimum pitch angle of the camera and the location at which the upper beam of the camera intersects the ground in the case of the minimum height of the optical center of the camera and the maximum pitch angle of the camera.

Figure 6A:
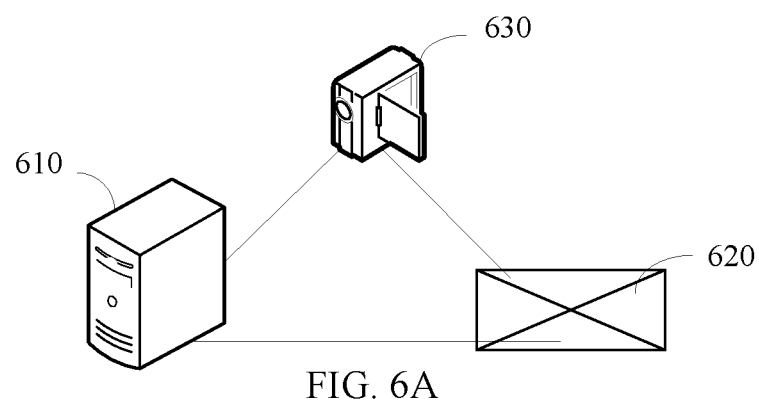
FIG. 6A and FIG. 6B are schematic diagrams of an architecture of a positioning system according to an embodiment of this application.
Figure 6B:
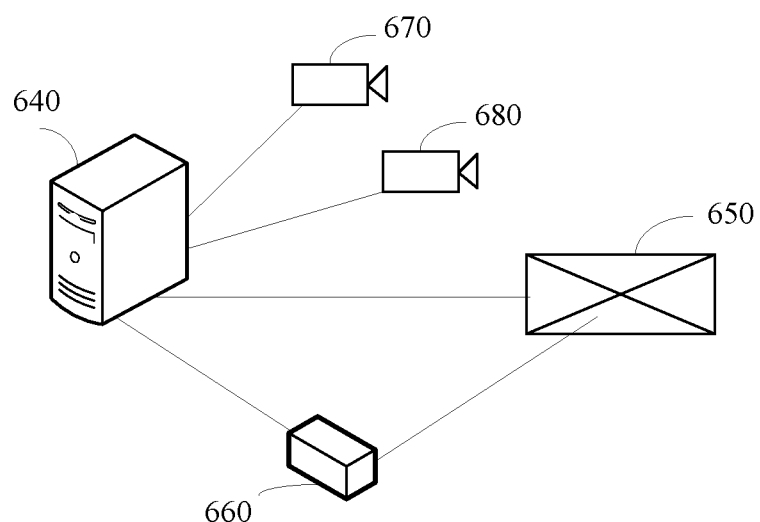

FIG. 6A and FIG. 6B are schematic diagrams of an architecture of a positioning system according to an embodiment of this application.

The positioning system shown in FIG. 6A includes an edge device 610, a vehicle 620, and an intelligent camera 630.

The edge device 610 may be an edge device deployed in an initialization process of a parking lot. The intelligent camera 630 may be an intelligent camera deployed in the initialization process of the parking lot.

The vehicle 620 may be an intelligent connected vehicle traveling or stopping in the parking lot. The vehicle 620 may include a telematics box (T-Box), a domain controller (DC), a multi-domain controller (MDC), an on-board unit (OBU), an Internet of vehicle chip, and the like.

After the parking lot is initialized, the edge device 610 stores an electronic map of the parking lot. A map layer of the electronic map stores world coordinates of a visual identifier in a shooting region of the intelligent camera 630. Alternatively, the map layer of the electronic map stores the world coordinates of the visual identifier in the shooting region of the intelligent camera 630 and an initial extrinsic parameter of the intelligent camera 630. A special visual identifier exists between a location with a maximum value of a near-point distance of a field of view of the intelligent camera 630 and a location with a minimum value of a far-point distance of the field of view of the intelligent camera 630.

The edge device 610 may communicate with the vehicle 620 and the intelligent camera 630, and provide a service for the vehicle 620 and the intelligent camera 630. For example, the edge device 610 may send the world coordinates of the visual identifier in the shooting region of the intelligent camera 630 to the intelligent camera 630, so that the intelligent camera 630 calculates an estimated extrinsic parameter of the intelligent camera 630 based on the world coordinates of the visual identifier in the shooting region of the intelligent camera 630. For another example, after the vehicle 620 is positioned, the intelligent camera 630 may send world coordinates of the vehicle 620 to the edge device 610, and after receiving the world coordinates of the vehicle 620, the edge device 610 sends the world coordinates of the vehicle 620 to the vehicle 620, so that the vehicle 620 knows a location of the vehicle in the electronic map.

Optionally, the intelligent camera 630 communicates with the vehicle 620, and provides a service for the vehicle 620. For example, after the vehicle 620 is positioned, the intelligent camera 630 may send world coordinates of the vehicle 620 to the vehicle 620, so that the vehicle 620 knows a location of the vehicle in the electronic map.

It should be noted that the positioning system shown in FIG. 6A is merely an example and is not intended to limit the technical solutions of this application. A person skilled in the art should understand that, in a specific implementation process, the positioning system may further include another device, and quantities of edge devices, intelligent cameras, and vehicles may be determined based on a specific requirement.

The positioning system shown in FIG. 6B includes an edge device 640, a vehicle 650, an edge computing apparatus 660, a conventional camera 670, and a conventional camera 680.

For descriptions of the edge device 640 and the vehicle 650, refer to the foregoing descriptions of the edge device 610 and the vehicle 620. Details are not described again.

The edge computing apparatus 660 may be an edge computing apparatus deployed in an initialization process of a parking lot. The conventional camera 670 and the conventional camera 680 may be conventional cameras deployed in the initialization process of the parking lot.

Optionally, the edge computing apparatus 660 is a processor chip in an intelligent transportation edge (ITE) computing box (or ITE server).

After the parking lot is initialized, the edge device 640 stores an electronic map of the parking lot. A map layer of the electronic map stores world coordinates of a visual identifier in a shooting region of the conventional camera 670 and world coordinates of a visual identifier in a shooting region of the conventional camera 680. Alternatively, the map layer of the electronic map stores the world coordinates of the visual identifier in the shooting region of the conventional camera 670, the world coordinates of the visual identifier in the shooting region of the conventional camera 680, an initial extrinsic parameter of the conventional camera 670, and an initial extrinsic parameter of the conventional camera 680. A first special visual identifier exists between a location with a maximum value of a near-point distance of a field of view of the conventional camera 670 and a location with a minimum value of a far-point distance of the field of view of the conventional camera 670. A second special visual identifier exists between a location with a maximum value of a near-point distance of a field of view of the conventional camera 680 and a location with a minimum value of a far-point distance of the field of view of the conventional camera 680.

The first special visual identifier and the second special visual identifier may be the same or different.

In FIG. 6B, the conventional camera 670 may send an image of the shooting region of the conventional camera 670 to the edge device 640, so that the edge device 640 sends the image of the shooting region of the conventional camera 670 to the edge computing apparatus 660, or the conventional camera 670 may directly send the image of the shooting region of the conventional camera 670 to the edge computing apparatus 660, and the edge computing apparatus 660 may position a target in the shooting region of the conventional camera 670 based on the image of the shooting region of the conventional camera 670. The conventional camera 680 may send an image of the shooting region of the conventional camera 680 to the edge device 640, so that the edge device 640 sends the image of the shooting region of the conventional camera 680 to the edge computing apparatus 660, or the conventional camera 680 may directly send the image of the shooting region of the conventional camera 680 to the edge computing apparatus 660, and the edge computing apparatus 660 may position a target in the shooting region of the conventional camera 680 based on the image of the shooting region of the conventional camera 680.

In FIG. 6B, the edge device 640 may communicate with the vehicle 650 and the edge computing apparatus 660, and provide a service for the vehicle 640 and the edge computing apparatus 660. For example, the edge device 640 may send the world coordinates of the visual identifier in the shooting region of the conventional camera 670 to the edge computing apparatus 660, so that the edge computing apparatus 660 estimates an estimated extrinsic parameter of the conventional camera 670 based on the world coordinates of the visual identifier in the shooting region of the conventional camera 670. For another example, after the vehicle 650 is positioned, the edge computing apparatus 660 may send world coordinates of the vehicle 650 to the edge device 640, and after receiving the world coordinates of the vehicle 650, the edge device 640 sends the world coordinates of the vehicle 650 to the vehicle 650.

Optionally, the edge computing apparatus 660 communicates with the vehicle 650, and provides a service for the vehicle 650. For example, after the vehicle 650 is positioned, the edge computing apparatus 660 may send world coordinates of the vehicle 650 to the vehicle 650.

It should be noted that the positioning system shown in FIG. 6B is merely an example and is not intended to limit the technical solutions of this application. A person skilled in the art should understand that, in a specific implementation process, the positioning system may further include another device, and quantities of edge devices, edge computing apparatuses, conventional cameras, and vehicles may be determined based on a specific requirement.

Optionally, the intelligent camera 630 in FIG. 6A or the edge computing apparatus 660 in FIG. 6B in this embodiment of this application may be a functional module in a device. It may be understood that the function module may be a network element in a hardware device, for example, a communications chip in a mobile phone, or may be a software function running on dedicated hardware, or a virtualization function instantiated on a platform (for example, a cloud platform).

Figure 7:
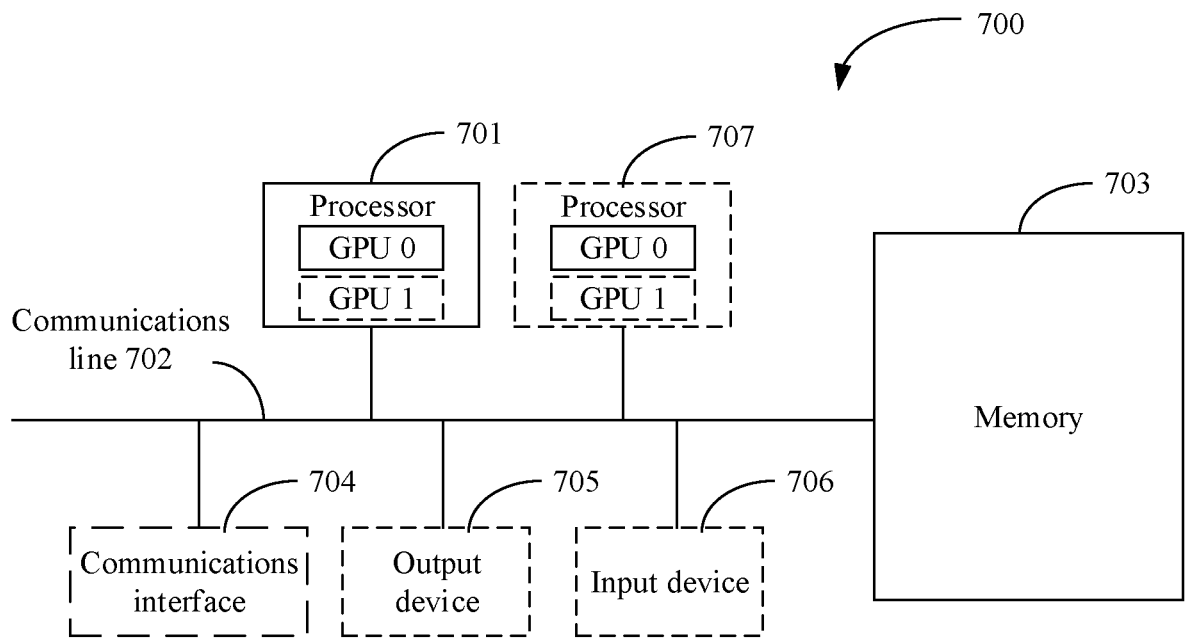
FIG. 7 is a schematic diagram of a hardware structure of a hardware device according to an embodiment of this application.

For example, the intelligent camera 630 in FIG. 6A or the edge computing apparatus 660 in FIG. 6B may be implemented by using a hardware device 700 in FIG. 7. FIG. 7 is a schematic diagram of a hardware structure of a hardware device applicable to an embodiment of this application. The hardware device 700 includes at least one processor 701, a communications line 702, and a memory 703.

The processor 701 may be a graphics processing unit (GPU), a microprocessor, an application-specific integrated circuit (ASIC), or one or more integrated circuits configured to control program execution of the solutions of this application.

The communications line 702 may include a path for transferring information between the foregoing components, for example, a bus.

The memory 703 may be a read-only memory (ROM) or another type of static storage device that can store static information and instructions, a random-access memory (RAM) or another type of dynamic storage device that can store information and instructions, an electrically erasable programmable ROM (EEPROM), a compact disc (CD) ROM (CD-ROM) or another optical disk storage, an optical disc storage (including a compact disc, a laser disc, an optical disc, a digital versatile disc (DVD), a BLU-RAY disc, and the like), a disk storage medium or another magnetic storage device, or any other medium that can be used to carry or store expected program code in a form of an instruction or a data structure and that can be accessed by a computer. However, this is not limited thereto. The memory may exist independently and is connected to the processor through the communications line 702. The memory may alternatively be integrated with the processor. The memory provided in this embodiment of this application may usually be non-volatile. The memory 703 is configured to store computer-executable instructions for executing the solutions related to this application, and the processor 701 controls execution. The processor 701 is configured to execute the computer-executable instructions stored in the memory 703, to implement the method provided in the embodiments of this application.

Optionally, the computer-executable instructions in this embodiment of this application may also be referred to as application program code. This is not limited in this embodiment of this application.

In a specific implementation, in an embodiment, the processor 701 may include one or more GPUs, for example, a GPU 0 and a GPU 1 shown in FIG. 7.

In a specific implementation, in an embodiment, the hardware device 700 may include a plurality of processors, for example, the processor 701 and a processor 707 in FIG. 7. Each of these processors may be a single-GPU processor, or may be a multi-GPU processor. The processor herein may refer to one or more devices, circuits, and/or processing cores configured to process data (for example, computer program instructions).

In a specific implementation, in an embodiment, the hardware device 700 may further include a communications interface 704. The communications interface 704 uses any apparatus such as a transceiver, to communicate with another device or a communications network, for example, an Ethernet interface, a radio access network (RAN) interface, or a wireless local area network (WLAN) interface.

In a specific implementation, in an embodiment, the hardware device 700 may further include an output device 705 and an input device 706. The output device 705 communicates with the processor 701, and may display information in a plurality of manners. For example, the output device 705 may be a liquid-crystal display (LCD), a light-emitting diode (LED) display device, a cathode-ray tube (CRT) display device, a projector, or the like. The input device 706 communicates with the processor 701, and may receive an input from a user in a plurality of manners. For example, the input device 706 may be a mouse, a keyboard, a touchscreen device, or a sensor device.

Optionally, if the intelligent camera 630 in FIG. 6A is implemented by using the hardware device 700 in FIG. 7, the hardware device 700 further includes a camera, and the camera may be configured to capture image information.

The hardware device 700 may be a general-purpose device or a special-purpose device. A type of the hardware device 700 is not limited in this embodiment of this application.

The positioning method provided in the embodiments of this application is described below with reference to FIG. 1 to FIG. 7.

It may be understood that, in the embodiments of this application, the intelligent camera and/or the edge computing apparatus may perform some or all steps in the embodiments of this application. These steps are merely examples. In the embodiments of this application, other steps or variations of steps may be further performed. In addition, the steps may be performed in a sequence different from a sequence presented in the embodiments of this application, and not all steps in the embodiments of this application may need to be performed.

Figure 8:
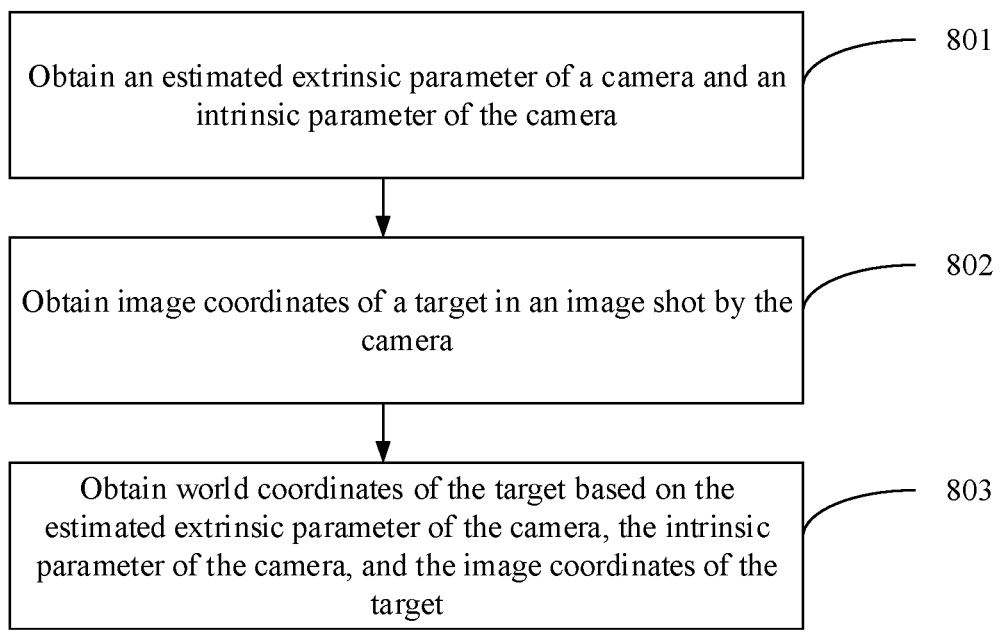
FIG. 8 is a schematic flowchart of a positioning method according to an embodiment of this application.

FIG. 8 shows a positioning method according to an embodiment of this application. The positioning method includes step 801 to step 803.

Step 801: Obtain an estimated extrinsic parameter of a camera and an intrinsic parameter of the camera.

The estimated extrinsic parameter of the camera is obtained based on world coordinates of a plurality of estimation points in a shooting region of the camera, image coordinates of the plurality of estimation points, and the intrinsic parameter of the camera.

The intrinsic parameter of the camera may include a FOV and a focal length of the camera.

Optionally, obtaining an estimated extrinsic parameter of a camera and an intrinsic parameter of the camera includes sending an identifier (ID) of the camera to an edge device, and receiving the estimated extrinsic parameter of the camera and the intrinsic parameter of the camera from the edge device.

The edge device may be the edge device 610 in FIG. 6A or the edge device 640 in FIG. 6B.

In a specific implementation, in an embodiment, the edge device stores a camera ID, an estimated extrinsic parameter corresponding to the camera ID, and an intrinsic parameter corresponding to the camera ID.

Step 802: Obtain image coordinates of a target in an image shot by the camera.

The target may be a person or an object to be positioned, for example, a vehicle, a person, or an animal in a parking lot.

Optionally, if the target is a vehicle, the image coordinates of the target may be coordinates of a feature pixel of the target in the image shot by the camera. If the target is not a vehicle, the image coordinates of the target may be coordinates of a contact point between the target and ground in the image shot by the camera.

The feature pixel of the target is a pixel corresponding to a feature parameter of the target.

The feature parameter of the target may include at least one of the following parameters: a height of a vehicle head from the ground, a height of a vehicle tail from the ground, and a height of a license plate edge from the ground.

For example, if the feature pixel of the target is a feature pixel of the vehicle head, the obtained feature parameter of the target may be the height of the vehicle head from the ground. If the feature pixel of the target is a feature pixel of the vehicle tail, the obtained feature parameter of the target may be the height of the vehicle tail from the ground. If the feature pixel of the target is a feature pixel of the license plate edge, the obtained feature parameter of the target may be the height of the license plate edge from the ground.

Figure 9A:
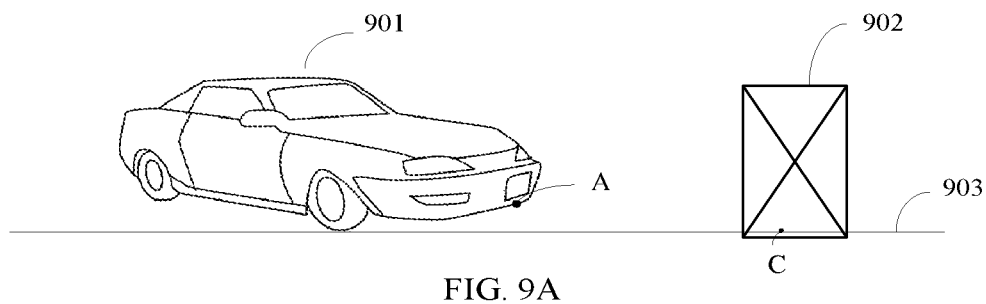
FIG. 9A and FIG. 9B are schematic diagrams of an image shot by a camera according to an embodiment of this application.
Figure 9B:
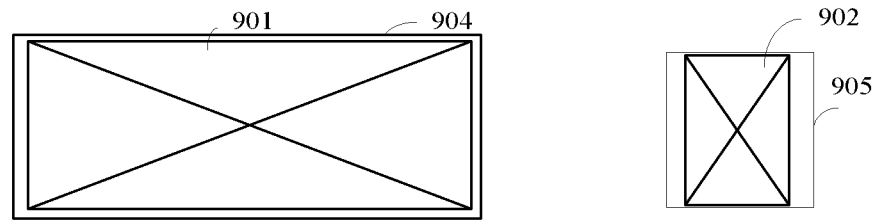

FIG. 9A and FIG. 9B are schematic diagrams of an image shot by a camera. In FIG. 9A, a point A is a feature pixel of a vehicle head of a vehicle 901 in the image shot by the camera. If the feature parameter of the target is the height of the vehicle head from the ground, image coordinates of the point A may be used as image coordinates of the vehicle 901. A point C is any point in a contact region between a person 902 and ground 903 in the image shot by the camera, and image coordinates of the point C may be used as image coordinates of the person 902.

In a possible implementation, the image shot by the camera is obtained every preset time. An image recognition algorithm is used to extract an image region from the image shot by the camera, and detect whether the extracted image region includes a to-be-positioned target. If the target is included, image coordinates of the target in the image shot by the camera are obtained.

The extracted image region may include a to-be-positioned target.

For example, in FIG. 9B, a region 904 and a region 905 are image regions extracted by using an image processing method from the image shot by the camera, and it is detected whether the region 904 and the region 905 include a target. The region 904 includes a to-be-positioned target (vehicle 901), and the region 905 includes a to-be-positioned target (person 902).

The preset time may be set based on an actual requirement. For example, during a peak period of parking or pickup, the preset time may be set to 50 milliseconds (ms), and during an off-peak period of parking or pickup, the preset time may be set to 100 ms.

In a specific implementation, in an embodiment, it is detected whether each image region that may include a target includes a target, which includes, based on a target recognition algorithm (such as you only look once version 3.0 (YOLOv3)) or a deep learning algorithm (such as a mask region-based convolutional neural network (mask RCNN)), detecting whether there is a target in the image region that may include a target, and classifying and recognizing the target.

Step 803: Obtain world coordinates of the target based on the estimated extrinsic parameter of the camera, the intrinsic parameter of the camera, and the image coordinates of the target.

In a possible implementation, if the target is a vehicle, obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, performing coordinate transformation on the image coordinates of the target, the physical transformation matrix corresponding to the estimated extrinsic parameter of the camera, and the intrinsic parameter matrix of the camera, to obtain first world coordinates, and obtaining the world coordinates of the target based on the feature parameter of the vehicle, a height of the camera, a location of the camera, and the first world coordinates. If the target is a vehicle, for a specific process of step 803, refer to the following descriptions in a first implementation scenario of the method shown in FIG. 8.

In another possible implementation, if the target is not a vehicle, obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, and performing coordinate transformation on the image coordinates of the target, the physical transformation matrix corresponding to the estimated extrinsic parameter of the camera, and the intrinsic parameter matrix of the camera, to obtain the world coordinates of the target. If the target is not a vehicle, for a specific process of step 803, refer to the following descriptions in a second implementation scenario of the method shown in FIG. 8.

Optionally, after step 803, the world coordinates of the target are updated to an electronic map, or the world coordinates of the target is sent to a traveling vehicle.

Optionally, updating the world coordinates of the target to an electronic map includes sending the world coordinates of the target to the edge device.

After receiving the world coordinates of the target, the edge device may store the world coordinates of the target in a map layer.

In a possible implementation, sending the world map of the target to a traveling vehicle includes directly sending the world map of the target to the traveling vehicle.

In another possible implementation, sending the world map of the target to a traveling vehicle includes sending the world map of the target to the edge device, so that after receiving the world map of the target, the edge device sends the world map of the target to the traveling vehicle.

Based on the method shown in FIG. 8, image coordinates of a vehicle or a person in the image shot by the camera are obtained, and then the image coordinates of the vehicle or the person are transformed into world coordinates of the vehicle or the person based on the estimated extrinsic parameter obtained by using the world coordinates of the plurality of estimation points in the shooting region of the camera and the image coordinates of the plurality of estimation points. In this way, the vehicle or the person is positioned, and positioning precision is high.

Further, optionally, in the first implementation scenario of the method shown in FIG. 8, if the target is a vehicle, the method shown in FIG. 8 further includes obtaining image information of the target, and querying for a feature parameter of the vehicle based on the image information of the target, and obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, performing coordinate transformation on the image coordinates of the target, the physical transformation matrix corresponding to the estimated extrinsic parameter of the camera, and the intrinsic parameter matrix of the camera, to obtain first world coordinates, and obtaining the world coordinates of the target based on the feature parameter of the vehicle, a height of the camera, a location of the camera, and the first world coordinates.

The height of the camera may be a height of an optical center of the camera, and the location of the camera may be world coordinates of the camera, or a location of the camera in the electronic map. The height of the camera and the location of the camera may be stored in the edge device, so that the height of the camera and the location of the camera may be obtained from the edge device. For example, the ID of the camera is sent to the edge device, and the edge device sends, based on the ID of the camera, the height of the camera and the location of the camera that correspond to the camera ID.

The image information of the target may be an image region that may include the target, and the image information of the target may include a pixel of the target and color information of the pixel of the target.

The first world coordinates may be coordinates on the ground of the electronic map after the coordinate transformation is performed on the image coordinates of the target.

The physical transformation matrix corresponding to the estimated extrinsic parameter of the camera may be sW, that is, the physical transformation matrix corresponding to the estimated extrinsic parameter of the camera is a product of a scale factor and a physical transformation matrix of an extrinsic parameter of the camera.

Optionally, obtaining image information of the target includes obtaining the image information of the target based on the image shot by the camera.

Optionally, querying for a feature parameter of the vehicle based on the image information of the target includes querying for a vehicle type, a vehicle model, and/or a license plate category of the target based on the image information of the target, and querying for the feature parameter of the vehicle based on the vehicle type, the vehicle model, and/or the license plate category of the target.

For example, if it is learned through query based on the image information of the target that the target is a vehicle of a model B of a brand A, a feature parameter (for example, a height of a vehicle head from ground) of the vehicle of the model B of the brand A may be obtained through query.

Optionally, performing coordinate transformation on the image coordinates of the target, the physical transformation matrix corresponding to the estimated extrinsic parameter of the camera, and the intrinsic parameter matrix of the camera, to obtain first world coordinates includes obtaining the first world coordinates $(X_1, Y_1, Z_1)$ based on a formula $$\begin{pmatrix} X_1 \\ Y_1 \\ Z_1 \\ 1 \end{pmatrix} = \begin{pmatrix} x_1 \\ y_1 \\ 1 \end{pmatrix} \Big/ sMW,$$

where $(x_1, y_1)$ are the image coordinates of the target.

Optionally, obtaining the world coordinates of the target based on the feature parameter of the vehicle, a height of the camera, a location of the camera, and the first world coordinates includes calculating a distance between the first world coordinates and the world coordinates of the target based on a formula $d_1 = G_1 * d_2 / G$, and obtaining the world coordinates of the target based on the distance between the first world coordinates and the world coordinates of the target and the first world coordinates.

$d_1$ is the distance between the first world coordinates and the world coordinates of the target, $G_1$ is the feature parameter, $G$ is the height of the optical center of the camera, and $d_2$ is a distance between projection coordinates of the optical center of the camera on the ground and the first world coordinates.

Figure 10A:
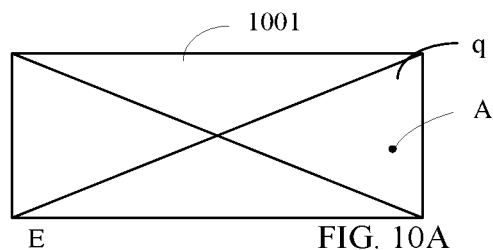
FIG. 10A and FIG. 10B are principle diagrams of obtaining world coordinates of a target based on first world coordinates according to an embodiment of this application.
Figure 10B:
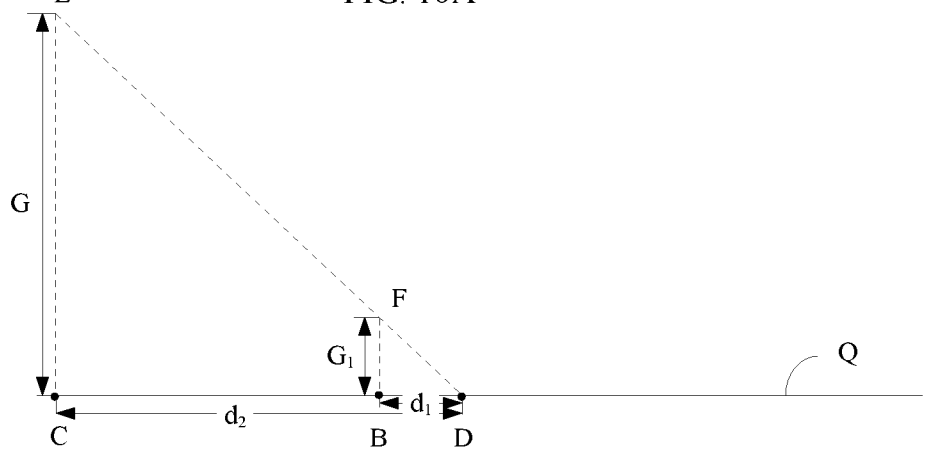

FIG. 10A and FIG. 10B are principle diagrams of obtaining world coordinates of a target based on first world coordinates. A coordinate system used in FIG. 10A is an image coordinate system, and a coordinate system used in FIG. 10B is a world coordinate system. A transformation relationship between an image plane q shown in FIG. 10A and ground Q in FIG. 10B is q=sHQ. A specific process of obtaining the world coordinates of the target based on the feature parameter of the vehicle, a height of the camera, a location of the camera, and the first world coordinates is described below by using an example in which a feature parameter of a vehicle 1001 is the height $G_1$ of the vehicle head from the ground and the height of the optical center of the camera is G.

In FIG. 10A, a point A is a feature pixel of a vehicle head of the vehicle 1001, and image coordinates of the point A may be used as the image coordinates of the target. In FIG. 10B, a point D is a point on the ground Q of the electronic map after coordinate transformation is performed on the image coordinates of the target (that is, the image coordinates of the point A) based on the transformation relationship q=sHQ, that is, world coordinates of the point D on the ground Q of the electronic map are the first world coordinates, coordinates of a point E are the world coordinates of the optical center of the camera, and coordinates of a point C are the projection coordinates of the optical center of the camera on the ground Q of the electronic map. First, a triangular DCE is constructed based on the points D, C, and E. Then, a point F is found on an edge DE of the triangle DCE, so that a distance between the point F and a projection point (point B) of the point F on the ground Q of the electronic map is $G_1$. Coordinates of the point F may be described as world coordinates of a feature pixel of the vehicle head of the vehicle 1001. Next, a distance $d_2$ between the point C and the point D is calculated. Then, a distance $d_1$ between the first world coordinates and the world coordinates of the target (that is, a distance between the point B and the point D) may be calculated based on the formula $d_1 = G_1 * d_2/G$. Finally, the world coordinates of the target (that is, the coordinates of the point B) may be calculated based on the coordinates of the point D and $d_1$.

Based on the first implementation scenario of the method shown in FIG. 8, if the target is a vehicle, a feature parameter of the vehicle may be obtained through query based on the image information of the target, coordinate transformation may be performed on the image coordinates of the target, the physical transformation matrix corresponding to the estimated extrinsic parameter of the camera, and the intrinsic parameter matrix of the camera, to obtain first world coordinates, and the world coordinates of the target may be obtained based on the feature parameter of the vehicle, the height of the camera, the location of the camera, and the first world coordinates. In this way, the vehicle is positioned, and in a positioning process, the image coordinates of the target are first obtained by using an image processing method, and then the world coordinates of the target are calculated by using a mathematical formula, so that positioning precision is relatively high.

Further, optionally, in the second implementation scenario of the method shown in FIG. 8, if the target is not a vehicle, obtaining world coordinates of the target based on the estimated extrinsic parameter of the camera, the intrinsic parameter of the camera, and the image coordinates of the target includes obtaining, based on the estimated extrinsic parameter of the camera, a physical transformation matrix corresponding to the estimated extrinsic parameter of the camera, obtaining an intrinsic parameter matrix of the camera based on the intrinsic parameter of the camera, and performing coordinate transformation on the image coordinates of the target, the physical transformation matrix corresponding to the estimated extrinsic parameter of the camera, and the intrinsic parameter matrix of the camera, to obtain the world coordinates of the target.

The physical transformation matrix corresponding to the estimated extrinsic parameter of the camera may be sW, that is, the physical transformation matrix corresponding to the estimated extrinsic parameter of the camera is a product of a scale factor and a physical transformation matrix of an extrinsic parameter of the camera.

Optionally, performing coordinate transformation on the image coordinates of the target, the physical transformation matrix corresponding to the estimated extrinsic parameter of the camera, and the intrinsic parameter matrix of the camera, to obtain the world coordinates of the target includes obtaining the world coordinates $(X_2, Y_2, Z_2)$ of the target based on a formula $$\begin{pmatrix} X_2 \\ Y_2 \\ Z_2 \\ 1 \end{pmatrix} = \begin{pmatrix} x_2 \\ y_2 \\ 1 \end{pmatrix} / sMW,$$

where $(x_2, y_2)$ are the image coordinates of the target.

Based on the second implementation scenario of the method shown in FIG. 8, if the target is not a vehicle, coordinate transformation may be performed on the image coordinates of the target, the physical transformation matrix corresponding to the estimated extrinsic parameter of the camera, and the intrinsic parameter matrix of the camera, to obtain the world coordinates of the target. In this way, the target is positioned, and in a positioning process, the image coordinates of the target are first obtained by using an image processing method, and then the world coordinates of the target are calculated by using a mathematical formula, so that positioning precision is relatively high.

Further, optionally, in a third implementation scenario of the method shown in FIG. 8, the method shown in FIG. 8 further includes obtaining world coordinates of a first deviation based on the estimated extrinsic parameter of the camera, the intrinsic parameter of the camera, and image coordinates of the first deviation, obtaining world coordinates of a second deviation based on the estimated extrinsic parameter of the camera, the intrinsic parameter of the camera, and image coordinates of the second deviation, and calculating a distance between the world coordinates of the first deviation and the world coordinates of the second deviation, to obtain positioning precision of the target.

The image coordinates of the first deviation are coordinates obtained after a deviation d is added to the image coordinates of the target towards a vehicle traveling direction. The image coordinates of the second deviation are coordinates obtained after the deviation d is subtracted from the image coordinates of the target towards the vehicle traveling direction.

The positioning precision of the target may be an error introduced when the target is positioned.

For example, the image coordinates of the target are (x, y), a vehicle travels along a y direction of the image coordinate system, and d=0.5. Then, image coordinates of the first deviation are (x, y+0.5), and image coordinates of the second deviation are (x, y−0.5).

Optionally, obtaining world coordinates of a first deviation based on the estimated extrinsic parameter of the camera, the intrinsic parameter of the camera, and image coordinates of the first deviation includes obtaining the world coordinates $(X_{d1}, Y_{d1}, Z_{d1})$ of the first deviation based on a formula $$\begin{pmatrix} X_{d_1} \\ Y_{d_1} \\ Z_{d_1} \\ 1 \end{pmatrix} = \begin{pmatrix} x_{d_1} \\ y_{d_1} \\ 1 \end{pmatrix} / sMW,$$

where $(x_{d1}, y_{d1})$ are the image coordinates of the first deviation.

Optionally, obtaining world coordinates of a second deviation based on the estimated extrinsic parameter of the camera, the intrinsic parameter of the camera, and image coordinates of the second deviation includes obtaining the world coordinates $(X_{d2}, Y_{d2}, Z_{d2})$ of the second deviation based on a formula $$\begin{pmatrix} X_{d_2} \\ Y_{d_2} \\ Z_{d_2} \\ 1 \end{pmatrix} = \begin{pmatrix} x_{d_2} \\ y_{d_2} \\ 1 \end{pmatrix} / sMW,$$

where $(x_{d2}, y_{d2})$ are the image coordinates of the second deviation.

Optionally, calculating a distance between the world coordinates of the first deviation and the world coordinates of the second deviation, to obtain positioning precision of the target includes calculating the positioning precision of the target based on a formula:

$$D = \sqrt{(X_{d_1} - X_{d_2})^2 + (Y_{d_1} - Y_{d_2})^2 + (Z_{d_1} - Z_{d_2})^2}.$$

D is the positioning precision, $(X_{d1}, Y_{d1}, Z_{d1})$ are the world coordinates of the first deviation, and $(X_{d2}, Y_{d2}, Z_{d2})$ are the world coordinates of the second deviation.

Optionally, after the positioning precision of the target is obtained, the positioning precision of the target is updated to the electronic map, or the positioning precision of the target is sent to the traveling vehicle.

Optionally, updating the positioning precision of the target to the electronic map includes sending the positioning precision of the target to the edge device.

After receiving the positioning precision of the target, the edge device may store the positioning precision of the target in the map layer.

In a possible implementation, sending the positioning precision of the target to the traveling vehicle includes directly sending the positioning precision of the target to the traveling vehicle.

In another possible implementation, sending the positioning precision of the target to the traveling vehicle includes sending the positioning precision of the target to the edge device, so that after receiving the positioning precision of the target, the edge device sends the positioning precision of the target to the traveling vehicle.

Based on the third implementation scenario of the method shown in FIG. 8, the world coordinates of the first deviation may be obtained based on the estimated extrinsic parameter of the camera, the intrinsic parameter of the camera, and the image coordinates of the first deviation, the world coordinates of the second deviation may be obtained based on the estimated extrinsic parameter of the camera, the intrinsic parameter of the camera, and the image coordinates of the second deviation, and then the distance between the world coordinates of the first deviation and the world coordinates of the second deviation is calculated to obtain the positioning precision of the target. In this way, a vehicle or a person can be more accurately positioned.

Further, optionally, in a fourth implementation scenario of the method shown in FIG. 8, the method shown in FIG. 8 further includes obtaining world coordinates of a special visual identifier in the shooting region of the camera, obtaining the world coordinates of the plurality of estimation points in the shooting region based on the world coordinates of the special visual identifier, obtaining image coordinates of the special visual identifier in the shooting region of the camera, obtaining the image coordinates of the plurality of estimation points in the shooting region based on the image coordinates of the special visual identifier, and obtaining the estimated extrinsic parameter of the camera based on the world coordinates of the plurality of estimation points, the image coordinates of the plurality of estimation points, and the intrinsic parameter of the camera.

The special visual identifier is located between first coordinates and second coordinates of the shooting region of the camera.

The first coordinates are coordinates of a location with a maximum value of a near-point distance of a field of view of the camera, and the second coordinates are coordinates of a location with a minimum value of a far-point distance of the field of view of the camera.

Optionally, the special visual identifier is a division line, and the division line is different from a division line surrounding the division line.

Optionally, obtaining world coordinates of a special visual identifier in the shooting region of the camera includes sending the ID of the camera to the edge device, receiving world coordinates of a visual identifier in the shooting region of the camera from the edge device, and obtaining the world coordinates of the special visual identifier in the shooting region of the camera based on an ID of the special visual identifier in the shooting region of the camera.

For example, a schematic diagram of deployment of a special visual identifier shown in FIG. 3A is used as an example to describe a specific process of obtaining world coordinates of a special visual identifier in a shooting region 302 of a camera 1. If a shooting region of the camera 1 is the region 302, the region 302 includes four visual identifiers, which are a general visual identifier 303, a special visual identifier 304, a general visual identifier 305, and a general visual identifier 306, respectively. An ID (such as the camera 1) of the camera may be sent to the edge device, and the edge device may send, based on the camera 1, IDs of the visual identifiers in the region 302 and world coordinates of the visual identifiers corresponding to the IDs of the visual identifiers (such as an ID of the general visual identifier 303, world coordinates of the general visual identifier 303, an ID of the special visual identifier 304, world coordinates of the special visual identifier 304, an ID of the general visual identifier 305, world coordinates of the general visual identifier 305, an ID of the general visual identifier 306, and world coordinates of the general visual identifier 306). After receiving the IDs of the visual identifiers in the region 302 and the world coordinates of the visual identifiers corresponding to the IDs of the visual identifiers that are sent by the edge device, the world coordinates of the special visual identifier may be obtained based on the ID of the special visual identifier.

The world coordinates of the special visual identifier are used to determine a location of the special visual identifier in the electronic map, and the world coordinates of the general visual identifier are used to determine a location of the general visual identifier in the electronic map.

In a specific implementation, in an embodiment, the world coordinates of the special visual identifier may be world coordinates of four corners of the special visual identifier, and the world coordinates of the general visual identifier may be world coordinates of four corners of the general visual identifier.

Optionally, after receiving the world coordinates of the visual identifier in the shooting region of the camera from the edge device, a simulated road is generated based on the world coordinates of the visual identifier, the intrinsic parameter of the camera, and the estimated extrinsic parameter of the camera. The simulated road is a virtual road corresponding to a road in the shooting region of the camera.

Optionally, obtaining the world coordinates of the plurality of estimation points in the shooting region based on the world coordinates of the special visual identifier includes obtaining world coordinates of a general visual identifier near the special visual identifier based on the world coordinates of the special visual identifier, and obtaining the world coordinates of the plurality of estimation points in the shooting region based on the world coordinates of the special visual identifier and the world coordinates of the general visual identifier.

For example, the schematic diagram of deployment of a special visual identifier shown in FIG. 3A is used as an example to describe a specific process of obtaining the world coordinates of the plurality of estimation points in the shooting region based on the world coordinates of the special visual identifier 304. If the shooting region of the camera 1 is the region 302, the region 302 includes four visual identifiers, which are the general visual identifier 303, the special visual identifier 304, the general visual identifier 305, and the general visual identifier 306, respectively, and a general visual identifier near the special visual identifier 304 includes the general visual identifier 303 and the general visual identifier 305. It is assumed that the world coordinates of the general visual identifier 303 are finally determined to be obtained, and world coordinates of four corners of the special visual identifier 304 and world coordinates of four corners of the general visual identifier 303 are used as the world coordinates of the plurality of estimation points.

It should be noted that, in a process of obtaining the world coordinates of the plurality of estimation points in the shooting region based on the world coordinates of the special visual identifier, the world coordinates of the general visual identifier near the special visual identifier may be obtained, or world coordinates of a general visual identifier at a preset distance to the special visual identifier may be obtained. This is not limited.

It should be noted that, in a process of obtaining the world coordinates of the plurality of estimation points in the shooting region based on the world coordinates of the special visual identifier, world coordinates of a plurality of general visual identifiers may be obtained based on the world coordinates of the special visual identifier, and the world coordinates of the plurality of estimation points may be obtained based on the world coordinates of the plurality of general visual identifiers. The plurality of estimation points may include points at four corners of each general visual identifier.

In a possible implementation, obtaining image coordinates of the special visual identifier in the shooting region of the camera includes obtaining an image shot by the camera, extracting visual identifiers by using a feature extraction algorithm from the image shot by the camera, extracting image coordinates of four corners of the visual identifiers by using scale-invariant feature transform (SIFT), speeded up robust features (SURF), or other methods, and recognizing a special visual identifier in the visual identifiers by using color detection or other methods, and obtaining image coordinates of four corners of the special visual identifier.

Optionally, obtaining the image coordinates of the plurality of estimation points in the shooting region based on the image coordinates of the special visual identifier includes obtaining image coordinates of the general visual identifier near the special visual identifier based on the image coordinates of the special visual identifier, and obtaining the image coordinates of the plurality of estimation points in the shooting region based on the image coordinates of the special visual identifier and the image coordinates of the general visual identifier.

For example, the schematic diagram of deployment of a special visual identifier shown in FIG. 3A is used as an example to describe a specific process of obtaining the image coordinates of the plurality of estimation points in the shooting region based on the image coordinates of the special visual identifier 304. If the shooting region of the camera 1 is the region 302, the region 302 includes four visual identifiers, which are the general visual identifier 303, the special visual identifier 304, the general visual identifier 305, and the general visual identifier 306, respectively, and the general visual identifier near the special visual identifier 304 includes the general visual identifier 303 and the general visual identifier 305. It is assumed that the image coordinates of the general visual identifier 303 are finally determined to be obtained, and image coordinates of four corners of the special visual identifier 304 and image coordinates of four corners of the general visual identifier 303 are used as the image coordinates of the plurality of estimation points.

It should be noted that, in a process of obtaining the image coordinates of the plurality of estimation points in the shooting region based on the image coordinates of the special visual identifier, the image coordinates of the general visual identifier near the special visual identifier may be obtained, or image coordinates of the general visual identifier at the preset distance to the special visual identifier may be obtained. This is not limited.

It should be noted that, in a process of obtaining the image coordinates of the plurality of estimation points in the shooting region based on the image coordinates of the special visual identifier, image coordinates of the plurality of general visual identifiers may be obtained based on the image coordinates of the special visual identifier, and the image coordinates of the plurality of estimation points may be obtained based on the image coordinates of the plurality of general visual identifiers. The plurality of estimation points may include the points at the four corners of each general visual identifier.

Optionally, a quantity of the plurality of estimation points is greater than or equal to 8.

Obtaining the estimated extrinsic parameter of the camera based on the world coordinates of the plurality of estimation points, the image coordinates of the plurality of estimation points, and the intrinsic parameter of the camera may include obtaining the intrinsic parameter matrix of the camera based on the intrinsic parameter of the camera, obtaining, based on the world coordinates of the plurality of estimation points, the image coordinates of the plurality of estimation points, and the intrinsic parameter matrix of the camera, an equation system in which the physical transformation matrix corresponding to the estimated extrinsic parameter of the camera is an unknown number, and obtaining, by solving the equation system, the physical transformation matrix corresponding to the estimated extrinsic parameter of the camera, and obtaining the estimated extrinsic parameter of the camera based on the physical transformation matrix corresponding to the estimated extrinsic parameter of the camera. For a specific process of obtaining the estimated extrinsic parameter of the camera based on the world coordinates of the plurality of estimation points, the image coordinates of the plurality of estimation points, and the intrinsic parameter of the camera, refer to the following descriptions in a fifth implementation scenario of the method shown in FIG. 8.

Optionally, after the estimated extrinsic parameter of the camera is obtained, the estimated extrinsic parameter of the camera is sent to the edge device, to subsequently position the target based on the estimated extrinsic parameter of the camera, the intrinsic parameter of the camera, and the image coordinates of the target.

It should be noted that the method in the fourth implementation scenario of the method shown in FIG. 8 may be performed when there is no vehicle or no interference from another target in the parking lot.

For example, when there is no vehicle or no interference from another target in the parking lot, the world coordinates of the special visual identifier in the shooting region of the camera are obtained, the world coordinates of the plurality of estimation points in the shooting region are obtained based on the world coordinates of the special visual identifier, the image coordinates of the special visual identifier in the shooting region of the camera are obtained, the image coordinates of the plurality of estimation points in the shooting region are obtained based on the image coordinates of the special visual identifier, and the estimated extrinsic parameter of the camera is obtained based on the world coordinates of the plurality of estimation points, the image coordinates of the plurality of estimation points, and the intrinsic parameter of the camera.

Based on the fourth implementation scenario of the method shown in FIG. 8, the world coordinates of the special visual identifier in the shooting region of the camera may be obtained, the world coordinates of the plurality of estimation points in the shooting region may be obtained based on the world coordinates of the special visual identifier, the image coordinates of the special visual identifier in the shooting region of the camera may be obtained, the image coordinates of the plurality of estimation points in the shooting region may be obtained based on the image coordinates of the special visual identifier, and then the estimated extrinsic parameter of the camera may be obtained based on the world coordinates of the plurality of estimation points, the image coordinates of the plurality of estimation points, and the intrinsic parameter of the camera, to subsequently position the target based on the estimated extrinsic parameter of the camera, the intrinsic parameter of the camera, and the image coordinates of the target.

Further, optionally, in the fifth implementation scenario of the method shown in FIG. 8, obtaining the estimated extrinsic parameter of the camera based on the world coordinates of the plurality of estimation points, the image coordinates of the plurality of estimation points, and the intrinsic parameter of the camera includes obtaining the intrinsic parameter matrix of the camera based on the intrinsic parameter of the camera, obtaining, based on the world coordinates of the plurality of estimation points, the image coordinates of the plurality of estimation points, and the intrinsic parameter matrix of the camera, an equation system in which the physical transformation matrix corresponding to the estimated extrinsic parameter of the camera is an unknown number, and obtaining, by solving the equation system, the physical transformation matrix corresponding to the estimated extrinsic parameter of the camera, and obtaining the estimated extrinsic parameter of the camera based on the physical transformation matrix corresponding to the estimated extrinsic parameter of the camera.

For example, the quantity of the plurality of estimation points is 8, world coordinates of the eight estimation points are $(X_1, Y_1, Z_1)$, $(X_2, Y_2, Z_2)$, $(X_3, Y_3, Z_3)$, $(X_4, Y_4, Z_4)$, $(X_5, Y_5, Z_5)$, $(X_6, Y_6, Z_6)$, $(X_7, Y_7, Z_7)$ and $(X_8, Y_8, Z_8)$, respectively, and image coordinates of the eight estimation points are $(x_1, y_1)$, $(x_2, y_2)$, $(x_3, y_3)$, $(x_4, y_4)$, $(x_5, y_5)$, $(x_6, y_6)$, $(x_7, y_7)$, and $(x_8, y_8)$, respectively. Then, based on the world coordinates of the plurality of estimation points, the image coordinates of the plurality of estimation points, and the intrinsic parameter matrix of the camera, the following equation system in which the physical transformation matrix corresponding to the estimated extrinsic parameter of the camera is an unknown number may be obtained:

$$\begin{bmatrix} x_1 & x_2 & x_3 & x_4 & x_5 & x_6 & x_7 & x_8 \\ y_1 & y_2 & y_3 & y_4 & y_5 & y_6 & y_7 & y_8 \\ 1 & 1 & 1 & 1 & 1 & 1 & 1 & 1 \end{bmatrix} = sWM \begin{bmatrix} X_1 & X_2 & X_3 & X_4 & X_5 & X_6 & X_7 & X_8 \\ Y_1 & Y_2 & Y_3 & Y_4 & Y_5 & Y_6 & Y_7 & Y_8 \\ Z_1 & Z_2 & Z_3 & Z_4 & Z_5 & Z_6 & Z_7 & Z_8 \\ 1 & 1 & 1 & 1 & 1 & 1 & 1 & 1 \end{bmatrix}.$$

The equation system may be solved by using a method such as a constrained least square method or random sample consensus to obtain sW, and then the estimated extrinsic parameter of the camera may be obtained based on sW.

Based on the fifth implementation scenario of the method shown in FIG. 8, the intrinsic parameter matrix of the camera may be obtained based on the intrinsic parameter of the camera, the equation system in which the physical transformation matrix corresponding to the estimated extrinsic parameter of the camera is an unknown number may be obtained based on the world coordinates of the plurality of estimation points, the image coordinates of the plurality of estimation points, and the intrinsic parameter matrix of the camera, the physical transformation matrix corresponding to the estimated extrinsic parameter of the camera may be obtained by solving the equation system, and the estimated extrinsic parameter of the camera may be finally obtained based on the physical transformation matrix corresponding to the estimated extrinsic parameter of the camera, to subsequently position the target based on the estimated extrinsic parameter of the camera, the intrinsic parameter of the camera, and the image coordinates of the target.

It should be noted that the positioning method shown in FIG. 8 may be applied to the intelligent camera 630 in FIG. 6A or the edge computing apparatus 660 shown in FIG. 6B. With reference to FIG. 6A and FIG. 6B, the following describes how the positioning method shown in FIG. 8 is applied to the intelligent camera 630 in FIG. 6A or the edge computing apparatus 660 shown in FIG. 6B.

Figure 11A:
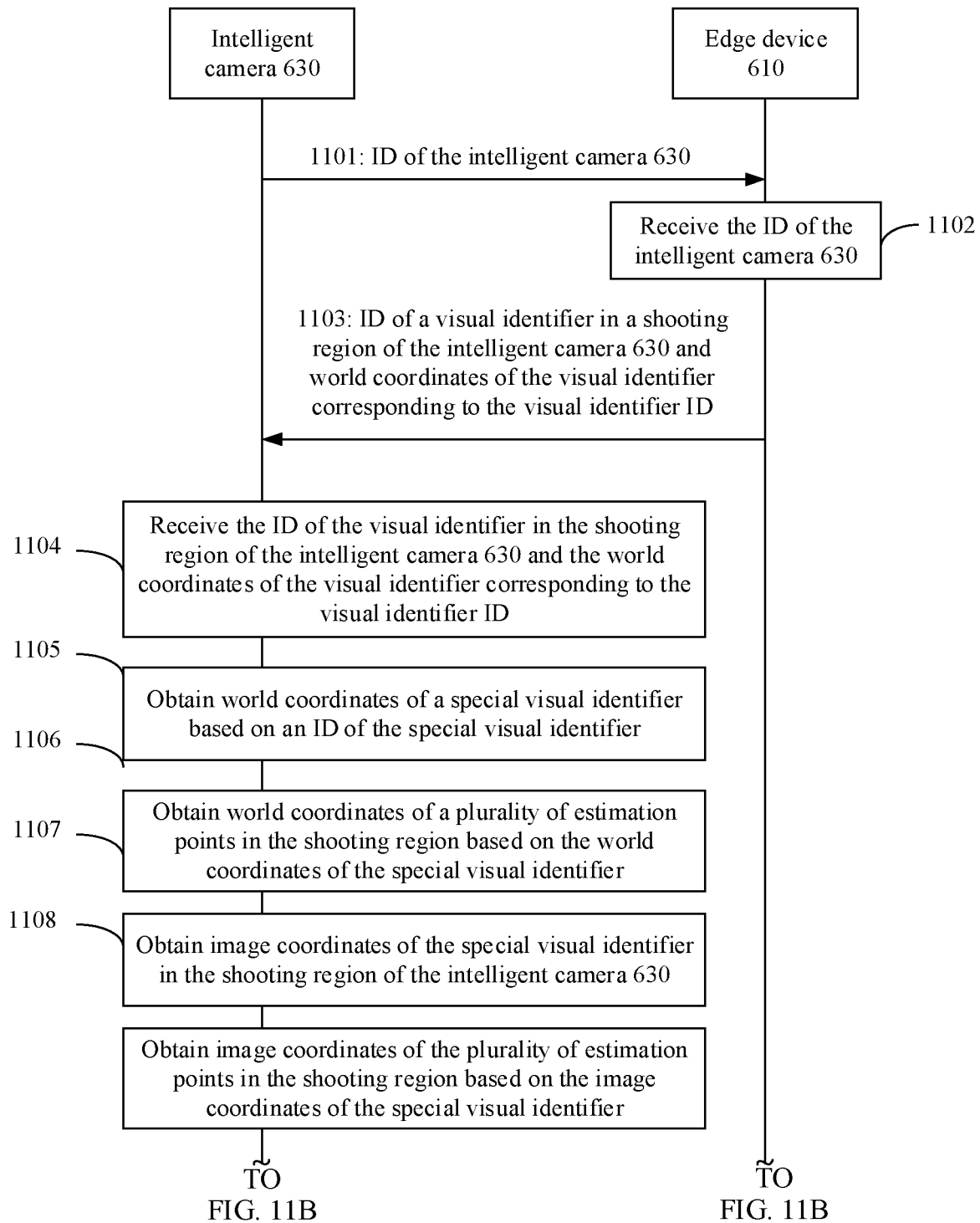
FIG. 11A, FIG. 11B, and FIG. 11C are a schematic flowchart of a positioning method according to an embodiment of this application.
Figure 11B:
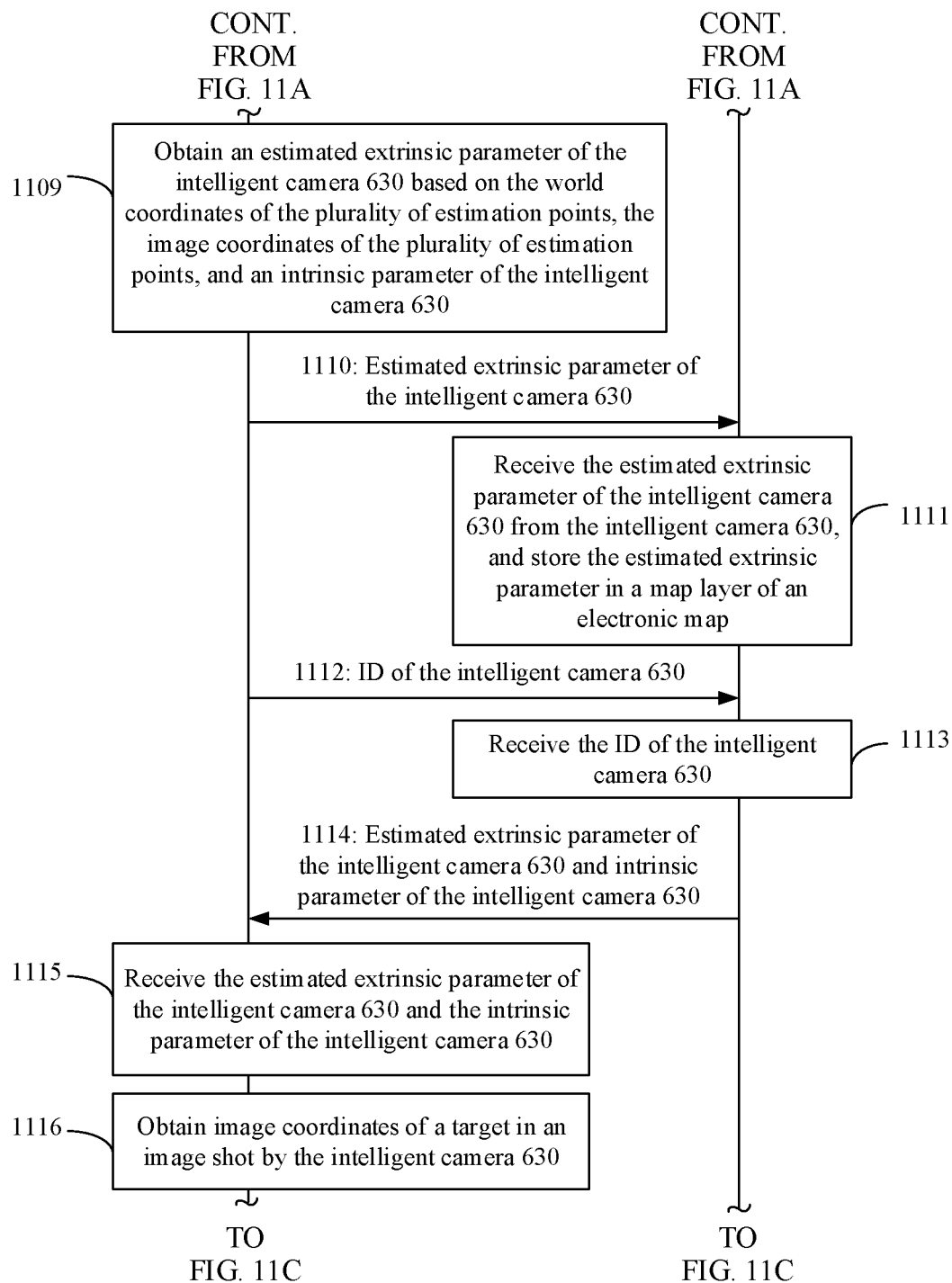
Figure 11C:
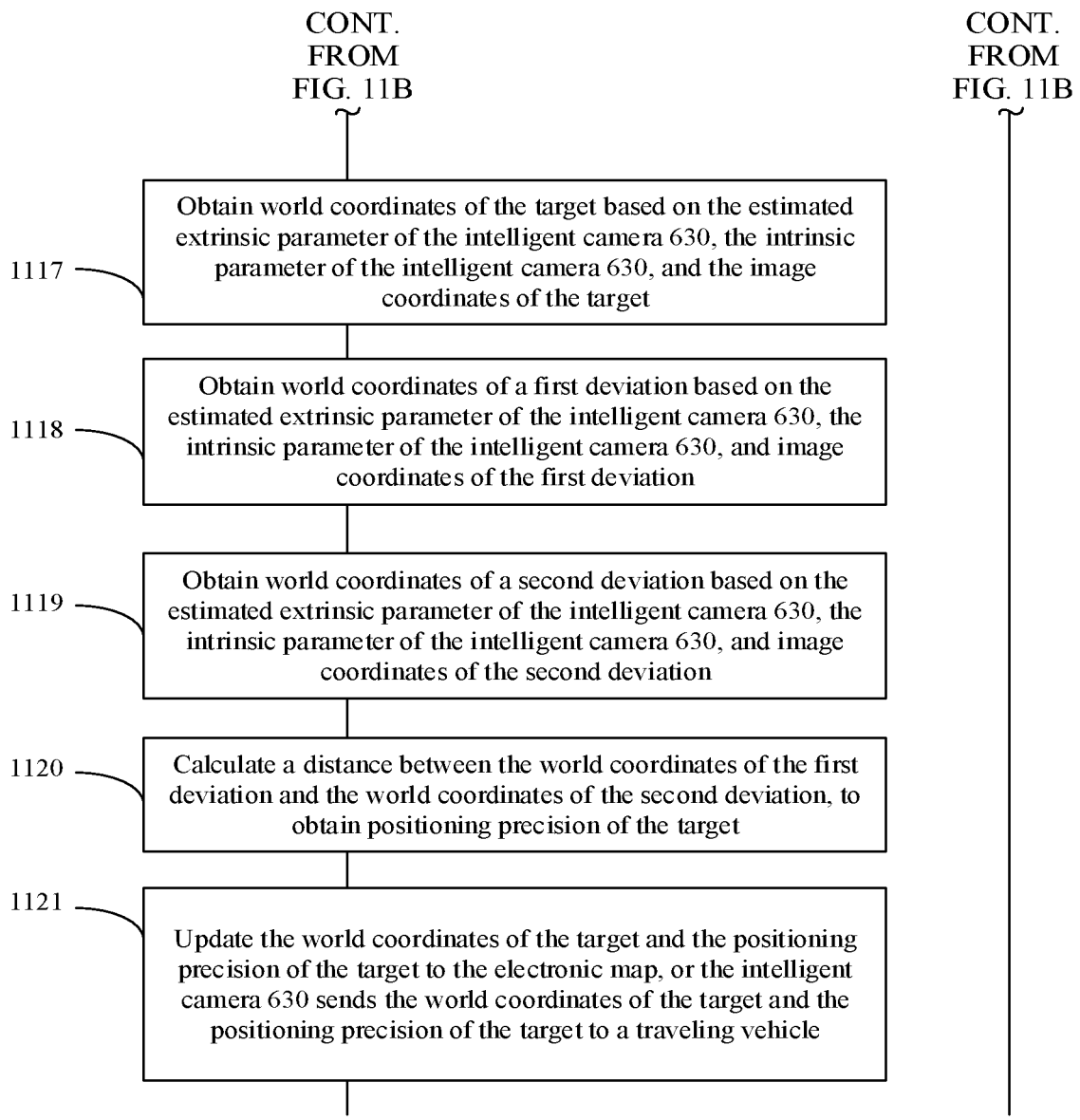

FIG. 11A to FIG. 11C show another positioning method according to an embodiment of this application. The positioning method includes step 1101 to step 1121.

Step 1101: The intelligent camera 630 sends an ID of the intelligent camera 630 to the edge device 610.

Step 1102: The edge device 610 receives the ID of the intelligent camera 630 from the intelligent camera 630.

Step 1103: The edge device 610 sends, to the intelligent camera 630 based on the ID of the intelligent camera 630, an ID of a visual identifier in a shooting region of the intelligent camera 630 and world coordinates of the visual identifier corresponding to the visual identifier ID.

Step 1104: The intelligent camera 630 receives, from the edge device 610, the ID of the visual identifier in the shooting region of the intelligent camera 630 and the world coordinates of the visual identifier corresponding to the visual identifier ID.

Step 1105: The intelligent camera 630 obtains world coordinates of a special visual identifier based on an ID of the special visual identifier.

Step 1106: The intelligent camera 630 obtains world coordinates of a plurality of estimation points in the shooting region based on the world coordinates of the special visual identifier.

For specific processes of step 1101 to step 1106, refer to the descriptions in the fourth implementation scenario of the method shown in FIG. 8. Details are not described herein again.

Step 1107: The intelligent camera 630 obtains image coordinates of the special visual identifier in the shooting region of the intelligent camera 630.

Optionally, the intelligent camera 630 shoots an image and stores the image, and extracts visual identifiers by using a feature extraction algorithm from the image shot by the intelligent camera 630, extracts image coordinates of four corners of the visual identifiers by using SIFT, SURF, or other methods, and recognizes a special visual identifier in the visual identifiers by using color detection or other methods, and obtains image coordinates of four corners of the special visual identifier.

Step 1108: The intelligent camera 630 obtains image coordinates of the plurality of estimation points in the shooting region based on the image coordinates of the special visual identifier.

For a specific process of step 1108, refer to the descriptions in the fourth implementation scenario of the method shown in FIG. 8. Details are not described herein again.

Step 1109: The intelligent camera 630 obtains an estimated extrinsic parameter of the intelligent camera 630 based on the world coordinates of the plurality of estimation points, the image coordinates of the plurality of estimation points, and an intrinsic parameter of the intelligent camera 630.

For a specific process of step 1109, refer to the descriptions in the fifth implementation scenario of the method shown in FIG. 8. Details are not described herein again.

Step 1110: The intelligent camera 630 sends the estimated extrinsic parameter of the intelligent camera 630 to the edge device 610.

Optionally, the intelligent camera 630 stores the estimated extrinsic parameter of the intelligent camera 630 in the intelligent camera 630.

Step 1111: The edge device 610 receives the estimated extrinsic parameter of the intelligent camera 630 from the intelligent camera 630, and stores the estimated extrinsic parameter in a map layer of an electronic map.

Step 1112: The intelligent camera 630 sends the ID of the intelligent camera 630 to the edge device 610.

Step 1113: The edge device 610 receives the ID of the intelligent camera 630 from the intelligent camera 630.

Step 1114: The edge device 610 sends the estimated extrinsic parameter of the intelligent camera 630 and the intrinsic parameter of the intelligent camera 630 to the intelligent camera 630 based on the ID of the intelligent camera 630.

It should be noted that, if the intelligent camera 630 stores the estimated extrinsic parameter of the intelligent camera 630 and the intrinsic parameter of the intelligent camera, the estimated extrinsic parameter of the intelligent camera 630 and the intrinsic parameter of the intelligent camera may be directly obtained from a memory of the intelligent camera 630.

Step 1115: The intelligent camera 630 receives the estimated extrinsic parameter of the intelligent camera 630 and the intrinsic parameter of the intelligent camera 630 from the edge device 610.

Step 1116: The intelligent camera 630 obtains image coordinates of a target in an image shot by the intelligent camera 630.

For a specific process of step 1116, refer to the descriptions in step 802 and the second implementation scenario of the method shown in FIG. 8. Details are not described herein again.

Step 1117: The intelligent camera 630 obtains world coordinates of the target based on the estimated extrinsic parameter of the intelligent camera 630, the intrinsic parameter of the intelligent camera 630, and the image coordinates of the target.

For a specific process of step 1117, refer to the descriptions in the first implementation scenario of the method shown in FIG. 8. Details are not described herein again.

Step 1118: The intelligent camera 630 obtains world coordinates of a first deviation based on the estimated extrinsic parameter of the intelligent camera 630, the intrinsic parameter of the intelligent camera 630, and image coordinates of the first deviation.

Step 1119: The intelligent camera 630 obtains world coordinates of a second deviation based on the estimated extrinsic parameter of the intelligent camera 630, the intrinsic parameter of the intelligent camera 630, and image coordinates of the second deviation.

Step 1120: The intelligent camera 630 calculates a distance between the world coordinates of the first deviation and the world coordinates of the second deviation, to obtain positioning precision of the target.

For specific processes of step 1118 to step 1120, refer to the descriptions in the third implementation scenario of the method shown in FIG. 8. Details are not described herein again.

Step 1121: The intelligent camera 630 updates the world coordinates of the target and the positioning precision of the target to the electronic map, or the intelligent camera 630 sends the world coordinates of the target and the positioning precision of the target to a traveling vehicle.

Based on the method shown in FIG. 11A to FIG. 11C, the intelligent camera 630 may obtain image coordinates of a vehicle or a person in the image shot by the intelligent camera 630, and then transform the image coordinates of the vehicle or the person into world coordinates of the vehicle or the person based on the estimated extrinsic parameter obtained by using the world coordinates of the plurality of estimation points in the shooting region of the intelligent camera 630 and the image coordinates of the plurality of estimation points. In this way, the vehicle or the person is positioned, and positioning precision is high.

Figure 12A:
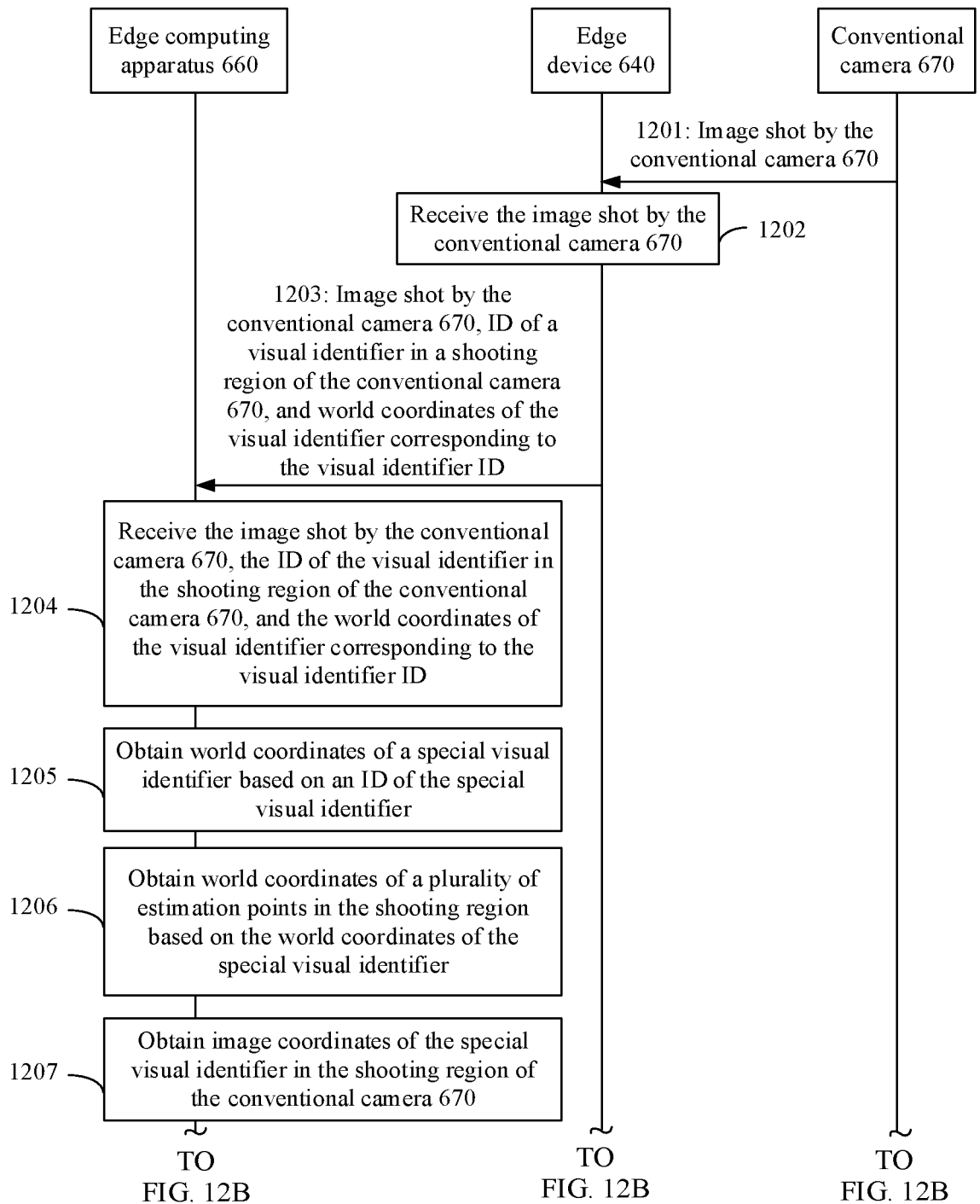
FIG. 12A, FIG. 12B, and FIG. 12C are a schematic flowchart of a positioning method according to an embodiment of this application.
Figure 12B:
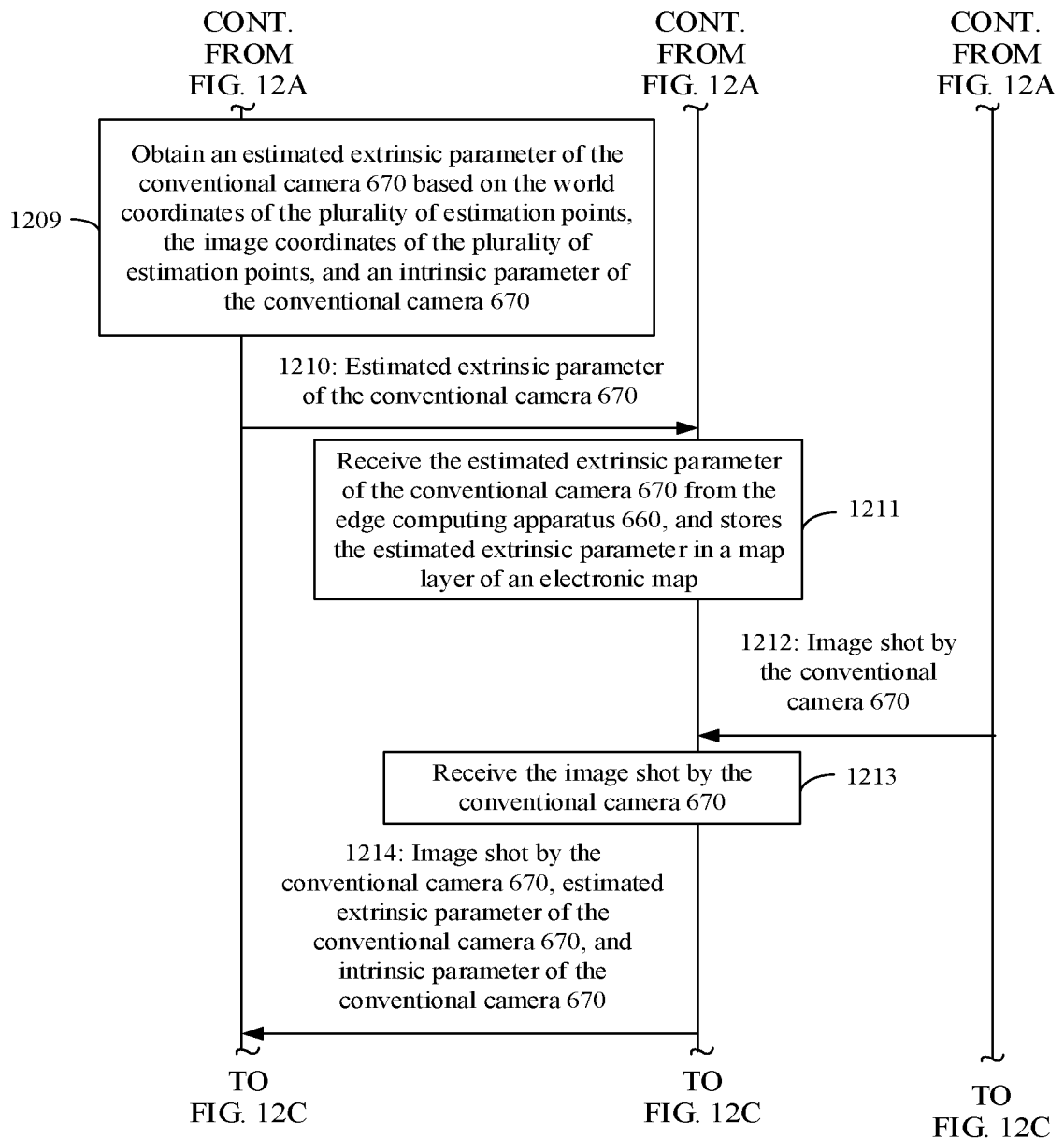
Figure 12C:
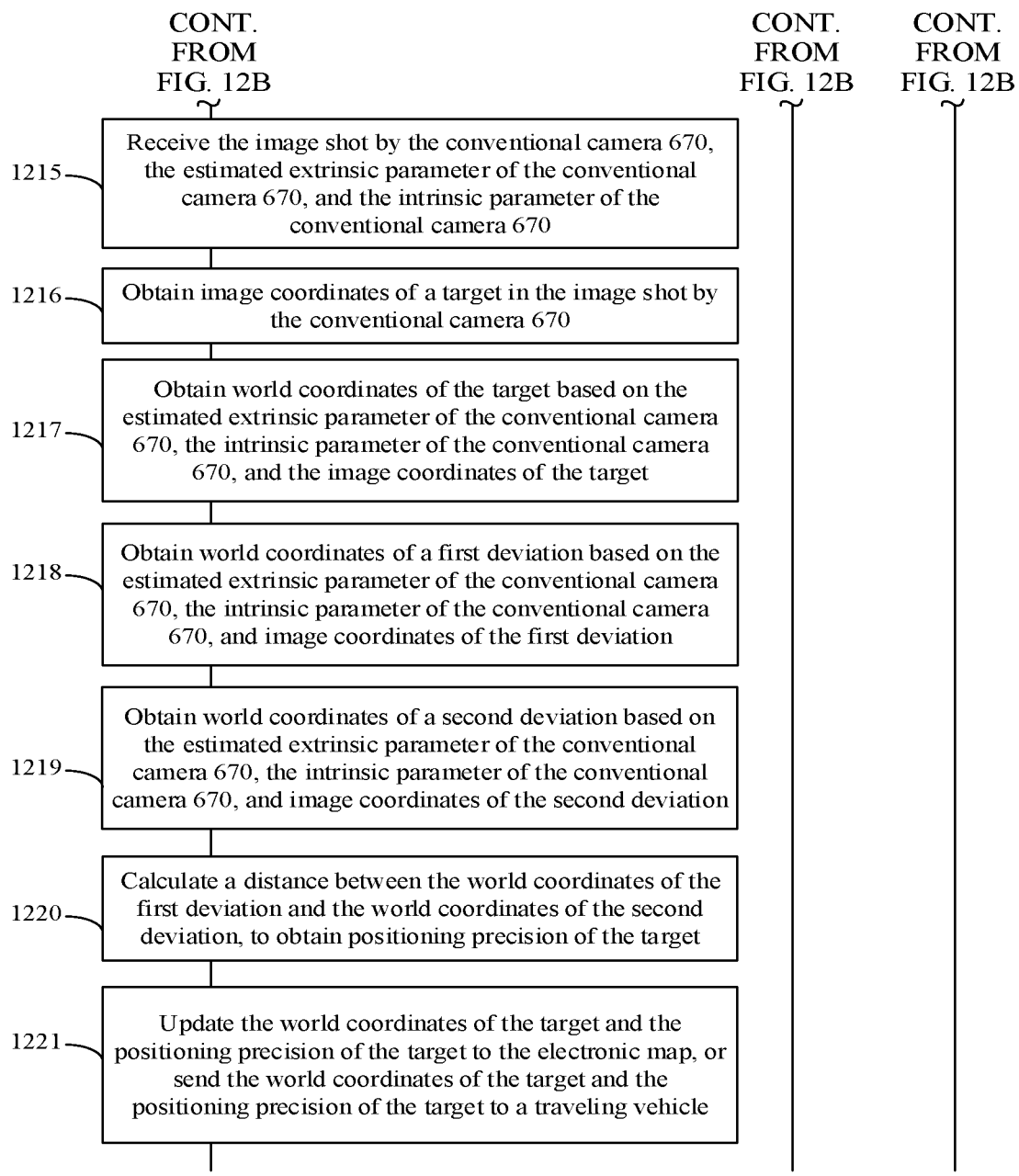

FIG. 12A to FIG. 12C show another positioning method according to an embodiment of this application. The positioning method includes step 1201 to step 1221.

Step 1201: The conventional camera 670 sends an image shot by the conventional camera 670 to the edge device 640.

Step 1202: The edge device 640 receives the image shot by the conventional camera 670 from the conventional camera 670.

Step 1203: The edge device 640 sends, to the edge computing apparatus 660, the image shot by the conventional camera 670, an ID of a visual identifier in a shooting region of the conventional camera 670, and world coordinates of the visual identifier corresponding to the visual identifier ID.

Step 1204: The edge computing apparatus 660 receives, from the edge device 640, the image shot by the conventional camera 670, the ID of the visual identifier in the shooting region of the conventional camera 670, and the world coordinates of the visual identifier corresponding to the visual identifier ID.

Step 1205: The edge computing apparatus 660 obtains world coordinates of a special visual identifier based on an ID of the special visual identifier.

Step 1206: The edge computing apparatus 660 obtains world coordinates of a plurality of estimation points in the shooting region based on the world coordinates of the special visual identifier.

For specific processes of step 1205 and step 1206, refer to the descriptions in the fourth implementation scenario of the method shown in FIG. 8. Details are not described herein again.

Step 1207: The edge computing apparatus 660 obtains image coordinates of the special visual identifier in the shooting region of the conventional camera 670.

Optionally, the edge computing apparatus 660 extracts, based on the received image shot by the conventional camera 670 from the edge device 640, visual identifiers by using a feature extraction algorithm from the image shot by the conventional camera 670, extracts image coordinates of four corners of the visual identifiers by using SIFT, SURF, or other methods, and recognizes a special visual identifier in the visual identifiers by using color detection or other methods, and obtains image coordinates of four corners of the special visual identifier.

Step 1208: The edge computing apparatus 660 obtains image coordinates of the plurality of estimation points in the shooting region based on the image coordinates of the special visual identifier.

For a specific process of step 1208, refer to the descriptions in the fourth implementation scenario of the method shown in FIG. 8. Details are not described herein again.

Step 1209: The edge computing apparatus 660 obtains an estimated extrinsic parameter of the conventional camera 670 based on the world coordinates of the plurality of estimation points, the image coordinates of the plurality of estimation points, and an intrinsic parameter of the conventional camera 670.

For a specific process of step 1209, refer to the descriptions in the fifth implementation scenario of the method shown in FIG. 8. Details are not described herein again.

Step 1210: The edge computing apparatus 660 sends the estimated extrinsic parameter of the conventional camera 670 to the edge device 640.

Optionally, the edge computing apparatus 660 stores the estimated extrinsic parameter of the conventional camera 670 in the edge computing apparatus 660.

Step 1211: The edge device 640 receives the estimated extrinsic parameter of the conventional camera 670 from the edge computing apparatus 660, and stores the estimated extrinsic parameter in a map layer of an electronic map.

Step 1212: The conventional camera 670 sends an image shot by the conventional camera 670 to the edge device 640.

Step 1213: The edge device 640 receives the image shot by the conventional camera 670 from the conventional camera 670.

Step 1214: The edge device 640 sends the image shot by the conventional camera 670, the estimated extrinsic parameter of the conventional camera 670, and the intrinsic parameter of the conventional camera 670 to the edge computing apparatus 660.

It should be noted that, if the edge computing apparatus 660 stores the estimated extrinsic parameter of the conventional camera 670, the estimated extrinsic parameter of the conventional camera 670 may be directly obtained from a memory of the edge computing apparatus 660.

Step 1215: The edge computing apparatus 660 receives the image shot by the conventional camera 670, the estimated extrinsic parameter of the conventional camera 670, and the intrinsic parameter of the conventional camera 670 from the edge device 640.

Step 1216: The edge computing apparatus 660 obtains image coordinates of a target in the image shot by the conventional camera 670.

For a specific process of step 1216, refer to the descriptions in step 802 and the second implementation scenario of the method shown in FIG. 8. Details are not described herein again.

Step 1217: The edge computing apparatus 660 obtains world coordinates of the target based on the estimated extrinsic parameter of the conventional camera 670, the intrinsic parameter of the conventional camera 670, and the image coordinates of the target.

For a specific process of step 1217, refer to the descriptions in the first implementation scenario of the method shown in FIG. 8. Details are not described herein again.

Step 1218: The edge computing apparatus 660 obtains world coordinates of a first deviation based on the estimated extrinsic parameter of the conventional camera 670, the intrinsic parameter of the conventional camera 670, and image coordinates of the first deviation.

Step 1219: The edge computing apparatus 660 obtains world coordinates of a second deviation based on the estimated extrinsic parameter of the conventional camera 670, the intrinsic parameter of the conventional camera 670, and image coordinates of the second deviation.

Step 1220: The edge computing apparatus 660 calculates a distance between the world coordinates of the first deviation and the world coordinates of the second deviation, to obtain positioning precision of the target.

For specific processes of step 1218 to step 1220, refer to the descriptions in the third implementation scenario of the method shown in FIG. 8. Details are not described herein again.

Step 1221: The edge computing apparatus 660 updates the world coordinates of the target and the positioning precision of the target to the electronic map, or the edge computing apparatus 660 sends the world coordinates of the target and the positioning precision of the target to a traveling vehicle.

Based on the method shown in FIG. 12A to FIG. 12C, the edge computing apparatus 660 may obtain image coordinates of a vehicle or a person in the image shot by the conventional camera 670, and then transform the image coordinates of the vehicle or the person into world coordinates of the vehicle or the person based on the estimated extrinsic parameter obtained by using the world coordinates of the plurality of estimation points in the shooting region of the conventional camera 670 and the image coordinates of the plurality of estimation points. In this way, the vehicle or the person is positioned, and positioning precision is high.

The solutions provided in the embodiments of this application are mainly described above from a perspective of interaction between apparatuses. It may be understood that, to implement the foregoing functions, the foregoing positioning apparatus (such as the intelligent camera 630 or the edge computing apparatus 660) includes a corresponding hardware structure and/or software module for performing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the computing apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In an actual implementation, another division manner may be used.

Figure 13:
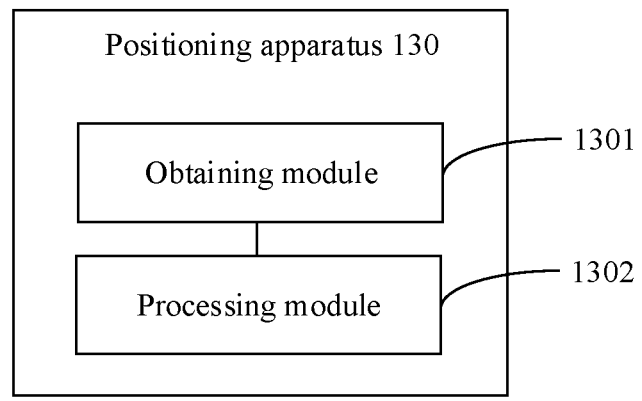
FIG. 13 is a schematic diagram of a structure of a positioning apparatus according to an embodiment of this application.

For example, when the functional modules are obtained through division in an integrated manner, FIG. 13 is a schematic diagram depicting a structure of a positioning apparatus 130. The positioning apparatus 130 includes an obtaining module 1301 and a processing module 1302.

The obtaining module 1301 is configured to obtain an estimated extrinsic parameter of a camera and an intrinsic parameter of the camera. The estimated extrinsic parameter of the camera is obtained based on world coordinates of a plurality of estimation points in a shooting region of the camera, image coordinates of the plurality of estimation points, and the intrinsic parameter of the camera.

The obtaining module 1301 is further configured to obtain image coordinates of a target in an image shot by the camera.

The processing module 1302 is configured to obtain world coordinates of the target based on the estimated extrinsic parameter of the camera, the intrinsic parameter of the camera, and the image coordinates of the target.

Figure 14:
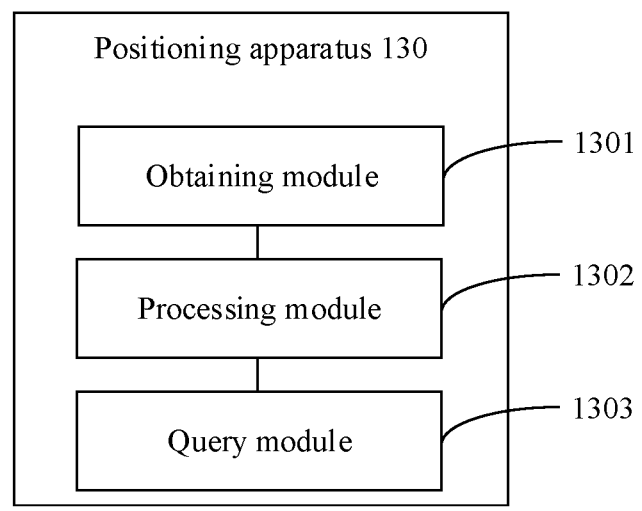
FIG. 14 is a schematic diagram of a structure of a positioning apparatus according to an embodiment of this application.

Optionally, as shown in FIG. 14, the positioning apparatus further includes a query module 1303. The obtaining module 1301 is further configured to obtain image information of the target. The query module 1303 is configured to query for a feature parameter of the vehicle based on the image information of the target. The processing module 1302 is further configured to obtain, based on the estimated extrinsic parameter of the camera, a physical transformation matrix corresponding to the estimated extrinsic parameter of the camera. The processing module 1302 is further configured to obtain an intrinsic parameter matrix of the camera based on the intrinsic parameter of the camera. The processing module 1302 is further configured to perform coordinate transformation on the image coordinates of the target, the physical transformation matrix corresponding to the estimated extrinsic parameter of the camera, and the intrinsic parameter matrix of the camera, to obtain first world coordinates. The processing module 1302 is further configured to obtain the world coordinates of the target based on the feature parameter of the vehicle, a height of the camera, a location of the camera, and the first world coordinates.

Optionally, if the target is a vehicle, the image coordinates of the target are coordinates of a feature pixel of the target in the image shot by the camera.

Optionally, if the target is not a vehicle, the processing module 1302 is further configured to obtain, based on the estimated extrinsic parameter of the camera, a physical transformation matrix corresponding to the estimated extrinsic parameter of the camera. The processing module 1302 is further configured to obtain an intrinsic parameter matrix of the camera based on the intrinsic parameter of the camera. The processing module 1302 is further configured to perform coordinate transformation on the image coordinates of the target, the physical transformation matrix corresponding to the estimated extrinsic parameter of the camera, and the intrinsic parameter matrix of the camera, to obtain the world coordinates of the target.

Optionally, if the target is not a vehicle, the image coordinates of the target are coordinates of a contact point between the target and ground in the image shot by the camera.

Optionally, the processing module is further configured to obtain world coordinates of a first deviation based on the estimated extrinsic parameter of the camera, the intrinsic parameter of the camera, and image coordinates of the first deviation. The image coordinates of the first deviation are coordinates obtained after a deviation d is added to the image coordinates of the target towards a vehicle traveling direction. The processing module is further configured to obtain world coordinates of a second deviation based on the estimated extrinsic parameter of the camera, the intrinsic parameter of the camera, and image coordinates of the second deviation. The image coordinates of the second deviation are coordinates obtained after the deviation d is subtracted from the image coordinates of the target towards the vehicle traveling direction. The processing module is further configured to calculate a distance between the world coordinates of the first deviation and the world coordinates of the second deviation, to obtain positioning precision of the target.

Optionally, the obtaining module is further configured to obtain world coordinates of a special visual identifier in the shooting region of the camera. The special visual identifier is located between first coordinates and second coordinates of the shooting region of the camera, and the first coordinates are coordinates of a location with a maximum value of a near-point distance of a field of view of the camera, and the second coordinates are coordinates of a location with a minimum value of a far-point distance of the field of view of the camera. The processing module is further configured to obtain the world coordinates of the plurality of estimation points in the shooting region based on the world coordinates of the special visual identifier. The obtaining module is further configured to obtain image coordinates of the special visual identifier in the shooting region of the camera. The processing module is further configured to obtain the image coordinates of the plurality of estimation points in the shooting region based on the image coordinates of the special visual identifier. The processing module is further configured to obtain the estimated extrinsic parameter of the camera based on the world coordinates of the plurality of estimation points, the image coordinates of the plurality of estimation points, and the intrinsic parameter of the camera.

Optionally, the processing module is further configured to obtain the intrinsic parameter matrix of the camera based on the intrinsic parameter of the camera. The processing module is further configured to obtain, based on the world coordinates of the plurality of estimation points, the image coordinates of the plurality of estimation points, and the intrinsic parameter matrix of the camera, an equation system in which the physical transformation matrix corresponding to the estimated extrinsic parameter of the camera is an unknown number, and obtain, by solving the equation system, the physical transformation matrix corresponding to the estimated extrinsic parameter of the camera. The processing module is further configured to obtain the estimated extrinsic parameter of the camera based on the physical transformation matrix corresponding to the estimated extrinsic parameter of the camera.

Optionally, the special visual identifier is a division line, and the division line is different from a division line surrounding the division line.

Figure 15:
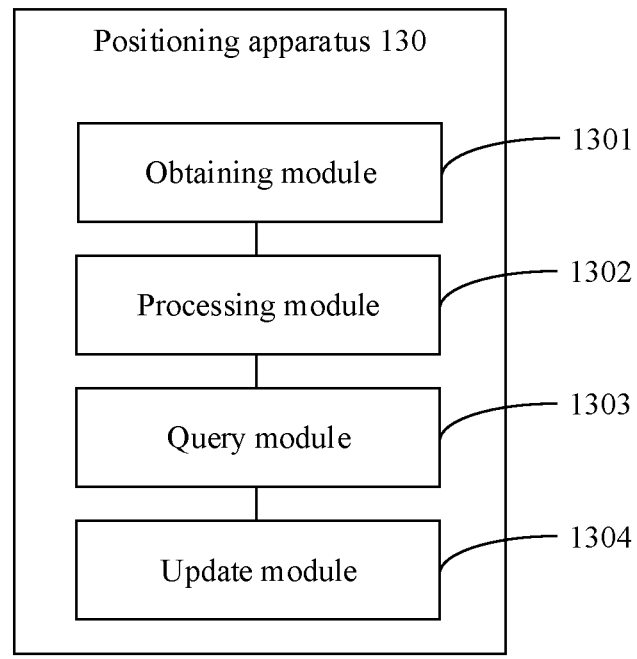
FIG. 15 is a schematic diagram of a structure of a positioning apparatus according to an embodiment of this application.

Optionally, as shown in FIG. 15, the positioning apparatus further includes an update module 1304. The update module is configured to update the estimated extrinsic parameter of the camera to an electronic map.

Figure 16:
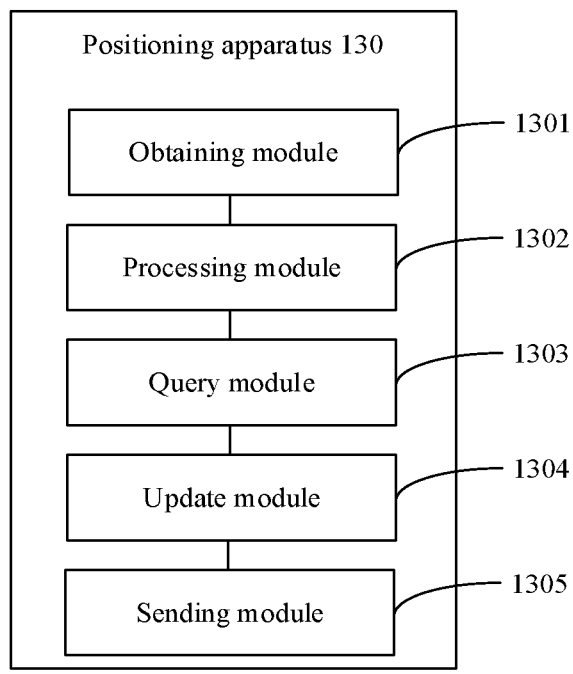
FIG. 16 is a schematic diagram of a structure of a positioning apparatus according to an embodiment of this application.

Optionally, as shown in FIG. 16, the positioning apparatus further includes a sending module 1305. The update module is configured to update the world coordinates of the target to the electronic map. Alternatively, the sending module is configured to send the world coordinates of the target to a traveling vehicle.

All related content of the operations in the foregoing method embodiments may be cited in function descriptions of the corresponding functional modules. Details are not described herein again.

In this embodiment, the positioning apparatus 130 is presented in a form in which the functional modules are obtained through division in an integrated manner. The "module" herein may be an ASIC, a circuit, a processor executing one or more software or firmware programs, a memory, an integrated logic circuit, and/or another component capable of providing the foregoing functions. In a simple embodiment, a person skilled in the art may conceive that the positioning apparatus 130 may be presented in a form shown in FIG. 7.

For example, the processor 701 in FIG. 7 may invoke computer-executable instructions stored in the memory 703, to enable the positioning apparatus 130 to perform the positioning method in the foregoing method embodiment.

For example, functions/implementation processes of the obtaining module 1301, the processing module 1302, the query module 1303, the update module 1304, and the sending module 1305 in FIG. 16 may be implemented by the processor 701 in FIG. 7 by invoking the computer-executable instructions stored in the memory 703. Alternatively, functions/implementation processes of the obtaining module 1301, the processing module 1302, the query module 1303, and the update module 1304 in FIG. 16 may be implemented by the processor 701 in FIG. 7 by invoking the computer-executable instruction stored in the memory 703, and a function/an implementation process of the sending module 1305 in FIG. 16 may be implemented by using the communications interface 704 in FIG. 7.

Because the positioning apparatus 130 provided in this embodiment can perform the foregoing positioning method, for technical effects that can be achieved by the positioning apparatus 130, refer to the foregoing method embodiment. Details are not described herein again.

Figure 17:
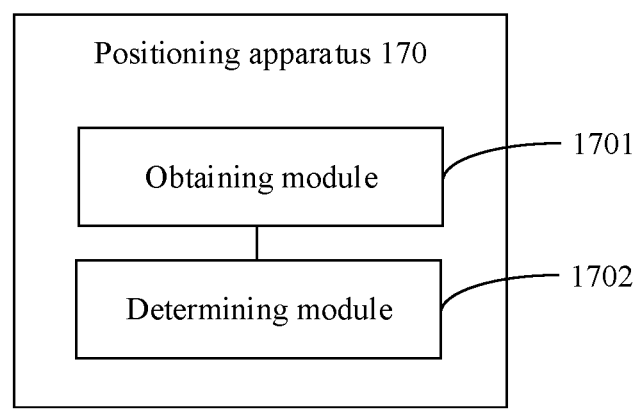
FIG. 17 is a schematic diagram of a structure of a positioning apparatus according to an embodiment of this application.

For example, when the functional modules are obtained through division in an integrated manner, FIG. 17 is a schematic diagram of a structure of a positioning apparatus 170. The positioning apparatus 170 includes an obtaining module 1701 and a determining module 1702.

The obtaining module 1701 is configured to obtain an initial extrinsic parameter of a camera and an intrinsic parameter of the camera.

The determining module 1702 is configured to determine a location of a special visual identifier in a parking lot based on the initial extrinsic parameter of the camera and the intrinsic parameter of the camera. The special visual identifier is used to position a target in a shooting region of the camera.

Optionally, the determining module 1702 is further configured to determine, based on the initial extrinsic parameter of the camera and the intrinsic parameter of the camera, a location with a maximum value of a near-point distance of a field of view of the camera and a location with a minimum value of a far-point distance of the field of view of the camera. The determining module 1702 is further configured to determine a region between the location with the maximum value of the near-point distance of the field of view of the camera and the location with the minimum value of the far-point distance of the field of view of the camera as the location of the special visual identifier.

Optionally, the initial extrinsic parameter of the camera includes a location of the camera, a height of the camera, and a pitch angle of the camera.

All related content of the operations in the foregoing method embodiments may be cited in function descriptions of the corresponding functional modules. Details are not described herein again.

In this embodiment, the positioning apparatus 170 is presented in a form in which the functional modules are obtained through division in an integrated manner. The "module" herein may be an ASIC, a circuit, a processor executing one or more software or firmware programs, a memory, an integrated logic circuit, and/or another component capable of providing the foregoing functions. In a simple embodiment, a person skilled in the art may conceive that the positioning apparatus 170 may be presented in a form shown in FIG. 7.

For example, the processor 701 in FIG. 7 may invoke computer-executable instructions stored in the memory 703, to enable the positioning apparatus 170 to perform the positioning method in the foregoing method embodiment.

For example, functions/implementation processes of the obtaining module 1701 and the determining module 1702 in FIG. 17 may be implemented by the processor 701 in FIG. 7 by invoking the computer-executable instructions stored in the memory 703.

Because the positioning apparatus 170 provided in this embodiment can perform the foregoing positioning method, for technical effects that can be achieved by the positioning apparatus 170, refer to the foregoing method embodiment. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
    obtaining an intrinsic parameter of a camera;
    obtaining an extrinsic parameter of the camera based on first world coordinates of a plurality of points in a shooting region of the camera, first image coordinates of the points, and the intrinsic parameter;
    obtaining second image coordinates of a first target in a first image shot by the camera;
    obtaining image information of the first target, wherein the first target comprises a vehicle;
    querying for a feature parameter of the vehicle based on the image information of the first target;
    obtaining a first physical transformation matrix corresponding to the extrinsic parameter based on the extrinsic parameter;
    obtaining a first intrinsic parameter matrix of the camera based on the intrinsic parameter;
    performing coordinate transformation on the second image coordinates, the first physical transformation matrix, and the first intrinsic parameter matrix to obtain obtaining second world coordinates; and
    obtaining third world coordinates of the first target based on the feature parameter, a height of the camera, a location of the camera, and the second world coordinates.

2. The method of claim 1, wherein the second image coordinates are of a feature pixel of the first target in the image.

3. The method of claim 1, further comprising:
    obtaining third image coordinates of a second target in a second image shot by the camera, wherein the second target is not a vehicle;
    obtaining a second physical transformation matrix corresponding to the extrinsic parameter based on the extrinsic parameter;
    obtaining a second intrinsic parameter matrix of the camera based on the intrinsic parameter; and
    performing coordinate transformation on the third image coordinates, the second physical transformation matrix, and the second intrinsic parameter matrix to obtain fourth world coordinates of the second target.

4. The method of claim 3, wherein the third image coordinates are of a contact point between the second target and ground in the image.

5. The method of claim 1, further comprising:
    obtaining fourth world coordinates of a special visual identifier in the shooting region, wherein the special visual identifier is located between a near-point of a field of view of the camera and a far-point of the field of view;
    obtaining the first world coordinates based on the fourth third world coordinates;
    obtaining fourth image coordinates of the special visual identifier; and
    obtaining the first image coordinates based on the fourth third image coordinates.

6. The method of claim 5, wherein the special visual identifier is a first division line, and wherein the first division line is different from a second division line surrounding the first division line.

7. An apparatus, comprising:
    a memory configured to store instructions; and
    one or more processors coupled to the memory and configured to execute the instructions to:
        obtain an extrinsic parameter of a camera;
        obtain an intrinsic parameter of the camera based on first world coordinates of a plurality of points in a shooting region of the camera, first image coordinates of the points, and the intrinsic parameter;
        obtain second image coordinates of a first target in a first image shot by the camera;
        obtain image information of the first target, wherein the first target comprises a vehicle;
        query for a feature parameter of the vehicle based on the image information of the first target;
        obtain a first physical transformation matrix corresponding to the extrinsic parameter based on the extrinsic parameter;
        obtain a first intrinsic parameter matrix of the camera based on the intrinsic parameter;
        perform coordinate transformation on the second image coordinates, the first physical transformation matrix, and the first intrinsic parameter matrix to obtain second world coordinates; and
        obtain third world coordinates of the first target based on the feature parameter, a height of the camera, a location of the camera, and the second world coordinates.

8. The apparatus of claim 7, wherein the second image coordinates are of a feature pixel of the first target in the image.

9. The apparatus of claim 7, wherein the one or more processors are further configured to execute the instructions to:
    obtain third image coordinates of a second target in a second image shot by the camera, wherein the second target is not a vehicle;
    obtain a second physical transformation matrix corresponding to the extrinsic parameter based on the extrinsic parameter;
    obtain a second intrinsic parameter matrix of the camera based on the intrinsic parameter; and
    perform coordinate transformation on the third image coordinates of the second target, the second physical transformation matrix, and the second intrinsic parameter matrix to obtain fourth world coordinates of the second target.

10. The apparatus of claim 9, wherein the third second image coordinates are of a contact point between the second target and ground in the image.

11. The apparatus of claim 7, wherein the one or more processors are further configured to execute the instructions to:

obtain fourth world coordinates of a special visual identifier in the shooting region, wherein the special visual identifier is located between a near-point of a field of view of the camera, and a far-point of the field of view of the camera;

obtain the first world coordinates based on the fourth third world coordinates;

obtain fourth image coordinates of the special visual identifier; and obtain the first image coordinates based on the fourth image coordinates.

12. The apparatus of claim 11, wherein the special visual identifier is a first division line, and wherein the first division line is different from a second division line surrounding the first division line.

13. A computer program product comprising instructions stored on a non-transitory computer-readable storage medium that, when executed by one or more processors, cause an apparatus to:

obtain an intrinsic parameter of a camera;

obtain an extrinsic parameter of the camera based on first world coordinates of a plurality of points in a shooting region of the camera, first image coordinates of the points, and the intrinsic parameter;

obtain second image coordinates of a first target in a first image shot by the camera;

obtain image information of the first target, wherein the first target comprises a vehicle;

query for a feature parameter of the vehicle based on the image information of the first target;

obtain a first physical transformation matrix corresponding to the extrinsic parameter based on the extrinsic parameter;

obtain a first intrinsic parameter matrix of the camera based on the intrinsic parameter;

perform coordinate transformation on the second image coordinates, the first physical transformation matrix, and the first intrinsic parameter matrix to obtain second world coordinates; and obtain third world coordinates of the first target based on the feature parameter, a height of the camera, a location of the camera, and the second world coordinates.

14. The computer program product of claim 13, wherein the second image coordinates are of a feature pixel of the first target in the image.

15. The computer program product of claim 13, wherein the one or more processors are further configured to execute the instructions to:

obtain third image coordinates of a second target in a second image shot by the camera, wherein the second target is not a vehicle;

obtain a second physical transformation matrix corresponding to the extrinsic parameter based on the extrinsic parameter;

obtain a second intrinsic parameter matrix of the camera based on the intrinsic parameter; and perform coordinate transformation on the third image coordinates, the second physical transformation matrix, and the second intrinsic parameter matrix to obtain fourth world coordinates of the second target.

16. The computer program product of claim 15, wherein the third image coordinates are of a contact point between the second target and ground in the image.

17. The computer program product of claim 13, wherein the one or more processors are further configured to execute the instructions to:

obtain fourth world coordinates of a special visual identifier in the shooting region, wherein the special visual identifier is located between a near-point of a field of view of the camera and a far-point of the field of view;

obtain the first world coordinates based on the fourth world coordinates;

obtain fourth image coordinates of the special visual identifier; and obtain the first image coordinates based on the fourth image coordinates.

18. The computer program product of claim 17, wherein the special visual identifier is a first division line, and wherein the first division line is different from a second division line surrounding the first division line.

19. The computer program product of claim 13, wherein the apparatus is configured to be implemented in automated valet parking.

20. The computer program product of claim 13, wherein the apparatus is configured to be implemented in indoors or underground.

* * * * *

UNITED STATES PATENT AND TRADEMARK OFFICE
CERTIFICATE OF CORRECTION

PATENT NO. : 12,229,990 B2
APPLICATION NO. : 17/680923
DATED : February 18, 2025
INVENTOR(S) : Yidan Teng et al.

Page 1 of 1

It is certified that error appears in the above-identified patent and that said Letters Patent is hereby corrected as shown below:

In the Claims

Claim 1, Column 41, Lines 40-41: "to obtain obtaining second" should read "to obtain second"

Claim 5, Column 42, Lines 8-9: "the fourth third image" should read "the fourth image"

Claim 10, Column 42, Lines 62-63: "third second image" should read "third image"

Signed and Sealed this
Fifteenth Day of April, 2025

Coke Morgan Stewart
*Acting Director of the United States Patent and Trademark Office*